(12) United States Patent
Montgomery et al.

(10) Patent No.: US 11,528,532 B2
(45) Date of Patent: *Dec. 13, 2022

(54) DEVICE RESOURCE MANAGEMENT DURING VIDEO STREAMING AND PLAYBACK

(71) Applicant: DISH Network L.L.C., Englewood, CO (US)

(72) Inventors: Jesse Montgomery, Denver, CO (US); Donald Dudrey, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/216,857

(22) Filed: Mar. 30, 2021

(65) Prior Publication Data
US 2021/0219018 A1     Jul. 15, 2021

Related U.S. Application Data

(63) Continuation of application No. 16/457,486, filed on Jun. 28, 2019, now Pat. No. 10,999,630, which is a
(Continued)

(51) Int. Cl.
*H04N 7/173*     (2011.01)
*H04N 21/462*     (2011.01)
(Continued)

(52) U.S. Cl.
CPC ......... *H04N 21/4621* (2013.01); *G06F 21/60* (2013.01); *G06F 21/606* (2013.01);
(Continued)

(58) Field of Classification Search
CPC ......... H04N 21/4621; H04N 21/44213; H04N 21/4424; H04N 21/472; H04N 21/4751;
(Continued)

(56) References Cited

U.S. PATENT DOCUMENTS

| | | | |
|---|---|---|---|
| 7,987,490 B2 * | 7/2011 | Ansari | G06F 16/68 |
| | | | 725/82 |
| 8,104,054 B2 | 1/2012 | Weaver et al. | |

(Continued)

OTHER PUBLICATIONS

Office Action for EP 18834207.5 dated Aug. 6, 2021, 6 pages.
(Continued)

*Primary Examiner* — Mulugeta Mengesha
(74) *Attorney, Agent, or Firm* — Kilpatrick Townsend & Stockton LLP

(57) ABSTRACT

Techniques described herein include evaluation and management of device hardware, software, and network resources during streaming, downloading, or playback of video resources on client devices from remote locations. Certain aspects relate to evaluating the current resources available at a client device, such as memory, processing capacity, device battery status, network availability and/or network data quotas, in view of a video resource request. Based on the evaluation of the client device's resources, and estimations of the effects that video streaming/downloading and playback may have on the client device's resources, the client device may control, customize, and/or alter the retrieval or playback of requested video resources.

15 Claims, 10 Drawing Sheets

Related U.S. Application Data continuation of application No. 15/857,240, filed on Dec. 28, 2017, now Pat. No. 10,382,822.

(51) Int. Cl.

| | | |
|---|---|---|
| *G06F 21/60* | (2013.01) | |
| *H04N 21/475* | (2011.01) | |
| *G06F 21/62* | (2013.01) | |
| *H04N 21/472* | (2011.01) | |
| *H04N 21/442* | (2011.01) | |
| *H04N 21/637* | (2011.01) | |
| *H04N 21/61* | (2011.01) | |

(52) U.S. Cl.
CPC ..... *G06F 21/6272* (2013.01); *H04N 21/4424* (2013.01); *H04N 21/44213* (2013.01); *H04N 21/472* (2013.01); *H04N 21/4751* (2013.01); *H04N 21/4753* (2013.01); *H04N 21/637* (2013.01); *H04N 21/6143* (2013.01)

(58) Field of Classification Search
CPC ............. H04N 21/4753; H04N 21/637; H04N 21/6143; G06F 21/60; G06F 21/606; G06F 21/6272
See application file for complete search history.

(56) References Cited

U.S. PATENT DOCUMENTS

| | | |
|---|---|---|
| 9,137,125 B1 | 9/2015 | Doronichev |
| 9,544,195 B1 | 1/2017 | Garg |
| 10,057,609 B2 | 8/2018 | Rieger et al. |
| 10,382,822 B2 | 8/2019 | Montgomery et al. |
| 2004/0203851 A1 | 10/2004 | Vetro et al. |
| 2008/0192820 A1 | 8/2008 | Brooks et al. |
| 2010/0088620 A1 | 4/2010 | Tran et al. |
| 2012/0222063 A1* | 8/2012 | Mao ................... H04N 21/6405 725/31 |
| 2013/0311660 A1 | 11/2013 | Alan et al. |
| 2013/0346624 A1 | 12/2013 | Chervets et al. |
| 2015/0067017 A1 | 3/2015 | Shah et al. |
| 2016/0044115 A1* | 2/2016 | Hill ....................... G06F 16/957 709/227 |
| 2019/0208275 A1 | 7/2019 | Montgomery et al. |
| 2020/0044988 A1* | 2/2020 | Liu .................... H04N 21/4431 |

OTHER PUBLICATIONS

International Search Report and Written Opinion for PCT/US2018/066734 dated Feb. 15, 2019, all pages.
International Preliminary Report on Patentability for PCT/US2018/066734 dated Jun. 30, 2020, all pages.

* cited by examiner

DEVICE RESOURCE MANAGEMENT DURING VIDEO STREAMING AND PLAYBACK

CROSS-REFERENCE TO RELATED APPLICATIONS

This application is a continuation of U.S. patent application Ser. No. 16/457,486, filed on Jun. 28, 2019, entitled "DEVICE RESOURCE MANAGEMENT DURING VIDEO STREAMING AND PLAYBACK," which application is a continuation of U.S. patent application Ser. No. 15/857,240, filed Dec. 28, 2017, entitled "DEVICE RESOURCE MANAGEMENT DURING VIDEO STREAMING AND PLAYBACK," now U.S. Pat. No. 10,382,822, issued on Aug. 13, 2019, the disclosures of which are hereby incorporated by reference in their entirety for all purposes.

TECHNICAL FIELD

The present disclosure relates to apparatuses and methods of requesting, transmitting, and executing video content on client devices. In particular, the disclosure relates to evaluating and managing of device hardware, software, and network resources, in response to requests for downloading and/or streaming video resources to client devices over various computer and network architectures.

BACKGROUND

Technologies for streaming and downloading video resources from back-end servers to client devices are ubiquitous and indispensable tools used in industries ranging from digital entertainment, gaming, online education, and business applications. A variety of computing systems and network architectures may be implemented to support video streaming, downloading, and playback, including Internet-based systems, satellite or cable communication systems, cellular/mobile network communications, etc. Client devices, such as business or residential based appliances (e.g., computers, televisions, etc.) as well as mobile devices of users, may retrieve video resources through a variety of front-end applications that may leverage any of the various computer and network architectures described herein, or any combination of such architectures. Often a user may initiate the retrieval of a particular video resource, either streaming for immediate viewing, or downloading for playback at a later time, with the user not ever knowing from which back-end servers the video will be retrieved, or over which networks the video will be transmitted.

When a client device requests a video from a back-end server, either for immediate streaming or downloading for later playback, the client device might not be aware of all of the characteristics of the requested video, such as the size, length, quality, storage location, and network access path of the requested video. Similarly, the back-end server from which the video has been requested might not be aware of certain operating characteristics or the current settings or status of the client device, such as the device's current allocation of hardware resources, software resources, network usage, and the like. Furthermore, during the process of streaming a video from a remote location to a client device, the characteristic of the video streaming process (e.g., storage location, streaming bit rate, video size/quality, networks used for streaming, etc.) may potentially change. For all of these reasons, the resource management and video retrieval/streaming determinations made at the client device and/or the remote storage location of the requested video may not correspond to the needs and priorities of the users and devices involved.

SUMMARY

Various techniques are described herein for evaluating and managing device hardware, software, and network resources during streaming and/or downloading of video resources from remote network locations to client devices. For example, certain aspects of the disclosure relate to evaluation of the current resources available at a client device, such as memory, processing capacity, device battery status, network availability and/or data quotas, in view of a video resource request. Based on the evaluation of the client device's resources, and an estimation of the effects that video streaming/downloading and playback may have on the client device's resources, the client device may control, customize, and/or alter the retrieval or playback of requested video resources.

In accordance with certain embodiments described herein, requests from client devices for video resources may be evaluated and controlled based on data allocation limits associated with the combination of the requesting entity and the communication network over which the requested vide may be transmitted, as well as the characteristics of the requested video resources. For example, a client device may initially request a particular video resource from a remote video content library. In response to the request, the characteristics of the particular video resource may be determined, and an amount of data required to transmit/receive the particular video resource from the remote location to the client device may be computed. Additionally, a data allocation limit may be determined based on the combination of the entity associated with the video request (e.g., a user, a client device, a household network/account, etc.), as well as the communication network(s) associated with the request. The retrieval and/or playback of the requested video resource may be controlled based on the determined data allocation limit, with respect to the amount of data required to receive the particular video resource. For example, the retrieval of a requested video may be prevented, allowed, or may cause the presentation of a user notification, based on a comparison of the amount of data required to receive the particular video resource to the determined data allocation limit. In certain embodiments, subsequent comparisons and modifications may be performed during an ongoing video streaming and playback process, for example, based on detected changes to the network over which the video is streaming.

Additional aspects described herein relate to evaluating and controlling requests from client devices for video resources based on the current hardware resource status of the client device. For example, a client device may initially request a particular video resource from a remote video content library. In response to the request, one or more current status data of the client device may be determined, such as the status of the device battery, memory, processors, software applications, device display settings, and/or access networks, etc. Additionally, the characteristics of the requested video resource may be determined, and calculations may be performed regarding how the streaming/downloading and playing the requested video resource may affect the current status the client device resources. By way of example, the client device may prevent a video from streaming and/or cause the presentation of a user notification in response to a determination that the client device has insufficient battery life to play the entire video. In other embodiments, certain device settings and/or video streaming behaviors may be customized based on the evaluation of the device's battery life. In further examples, the evaluations and estimations performed may leverage additional data, such as calendar or social media data from the user, as well as other user data sources, and the video downloading, streaming, and playback processes may be further controlled based on these additional factors.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures in conjunction with the description of certain embodiments presented herein. However, the appended figures should not be seen as limiting or defining the present disclosure.

Figure 1:
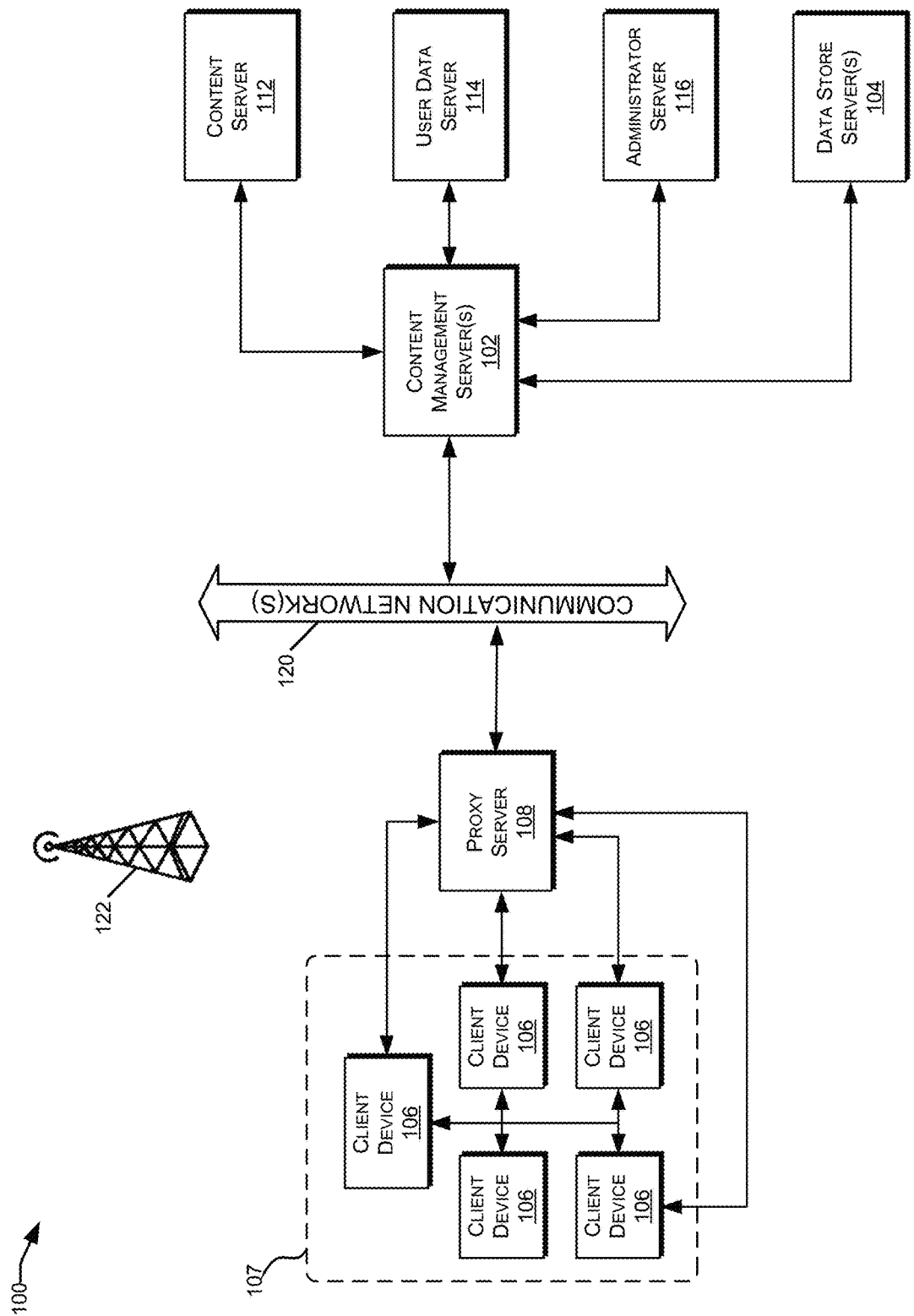
FIG. 1 is a block diagram illustrating an example of a video content distribution network, in accordance with certain embodiments of the present disclosure.

In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Various techniques (e.g., methods, systems, computer-readable storage media devices coupled to processors and storing computer executable instructions, etc.) are disclosed for evaluating and managing device hardware, software, and network resources during streaming and/or downloading of video resources from remote network locations to client devices. As discussed in the examples and embodiments below, such client devices may include television equipment such as set-top boxes, receivers, televisions and/or other corresponding electronic displays, computing devices such as desktop, laptop and tablet computers, mobile phones and other handheld electronic devices, and the like. Additionally, the video resources requested and transmission/received in the examples and embodiments discussed herein may include traditional television programming, such as linear television programs, as well as other types of audio, video and/or audio/video content, such as on-demand video content, streaming video content and the like delivered via any type of content delivery system, such as a cable, satellite, cellular/wireless, Internet/IP and/or any other content delivery technology or system currently known or hereafter developed. Features disclosed herein also may be incorporated into the device having the electronic display, such as a television with an integrated cable, satellite or IPTV receiver.

As discussed below, certain aspects of the disclosure relate to evaluation of the current resources available at a client device, such as memory, processing capacity, device battery status, network availability and/or data quotas, in view of a video resource request. Based on the evaluation of the client device's resources, and an estimation of the effects that video streaming/downloading and playback may have on the client device's resources, the client device may control, customize, and/or alter the retrieval or playback of requested video resources.

In accordance with certain embodiments described herein, requests from client devices for video resources may be evaluated and controlled based on data allocation limits associated with the combination of the requesting entity and the communication network over which the requested vide may be transmitted, as well as the characteristics of the requested video resources. For example, a client device may initially request a particular video resource from a remote video content library. In response to the request, the characteristics of the particular video resource may be determined, and an amount of data required to transmit/receive the particular video resource from the remote location to the client device may be computed. Additionally, a data allocation limit may be determined based on the combination of the entity associated with the video request (e.g., a user, a client device, a household network/account, etc.), as well as the communication network(s) associated with the request. The retrieval and/or playback of the requested video resource may be controlled based on the determined data allocation limit, with respect to the amount of data required to receive the particular video resource. For example, the retrieval of a requested video may be prevented, allowed, or may cause the presentation of a user notification, based on a comparison of the amount of data required to receive the particular video resource to the determined data allocation limit. In certain embodiments, subsequent comparisons and modifications may be performed during an ongoing video streaming and playback process, for example, based on detected changes to the network over which the video is streaming.

Additional aspects described herein relate to evaluating and controlling requests from client devices for video resources based on the current hardware resource status of the client device. For example, a client device may initially request a particular video resource from a remote video content library. In response to the request, one or more current status data of the client device may be determined, such as the status of the device battery, memory, processors, software applications, device display settings, and/or access networks, etc. Additionally, the characteristics of the requested video resource may be determined, and calculations may be performed regarding how the streaming/downloading and playing the requested video resource may affect the current status the client device resources. By way of example, the client device may prevent a video from streaming and/or cause the presentation of a user notification in response to a determination that the client device has insufficient battery life to play the entire video. In other embodiments, certain device settings and/or video streaming behaviors may be customized based on the evaluation of the device's battery life. In further examples, the evaluations and estimations performed may leverage additional data, such as calendar or social media data from the user, as well as other user data sources, and the video downloading, streaming, and playback processes may be further controlled based on these additional factors.

With reference now to FIG. 1, a block diagram is shown illustrating various components of a content distribution network (CDN) 100, over which requests for video resources from client devices may be received, evaluated, and provided in accordance with the techniques disclosed herein. In various embodiments, the content distribution network 100 may comprise one or several physical components and/or one or several virtual components such as, for example, one or several cloud computing components. In some embodiments, the content distribution network 100 can comprise a mixture of physical and cloud computing components.

Content distribution network 100 may include one or more content management servers 102, corresponding to the remote back-end servers that receive and respond to requests for video resources from client devices 106. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data (e.g., video resources) that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatively connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution. In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored video resources and other data relevant to the functions of the content distribution network 100. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more client devices 106, which may request and receive content resources (e.g., video files and streaming video content) from the back-end content management servers 102, through one or more communication networks 120. Client devices 106 may request, receive, and display content received via the content distribution network 100, and may support various types of user interactions with the content. Client devices 106 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other client devices 106 may be general purpose personal computers or special-purpose computing devices including, by way of example, personal computers, laptop computers, workstation computers, projection devices, and interactive room display systems. Additionally, client devices 106 may be any other electronic devices, such as a thin-client computers, an Internet-enabled gaming systems, business or home appliances, and/or a personal messaging devices, capable of communicating over network(s) 120.

In different contexts of content distribution networks 100, client devices 106 may correspond to different types of specialized devices, for example, televisions, receivers, and set-top boxes in a television or media distribution network, employee devices and presentation devices in a company network, gaming client devices in a gaming network, student devices and teacher devices in an educational network, etc. In some embodiments, client devices 106 may operate in the same physical location 107, such as a household 107 of networked client devices, and business office having a number of related client devices, etc. In such cases, the client devices 106 may contain components that support direct communications with other nearby devices, such as a wireless transceivers and wireless communications interfaces, Ethernet sockets or other Local Area Network (LAN) interfaces, etc. In other implementations, the client devices 106 need not be used at the same location 107, but may be used in remote geographic locations in which each client device 106 may use security features and/or specialized hardware (e.g., hardware-accelerated SSL and HTTPS, WS-Security, firewalls, etc.) to communicate with the content management server 102 and/or other remotely located client devices 106, to request and receive video content. Additionally, different client devices 106 may be assigned different designated roles, such as video presenter/presentee devices, teacher/student devices, administrator devices, or the like, and in such cases the different devices may be provided with additional hardware and/or software components to provide content and support user capabilities not available to the other devices.

The content distribution network 100 also may include one or more proxy servers 108 and/or firewall devices, which may act as intermediary devices between the client devices 106 and the back-end of the content distribution network 100 (as well as other web servers and remote servers on the Internet). Proxy servers 108 may provide various features for the client devices 106, such as security, connectivity, content filtering, and content caching. Thus, it may be possible to serve certain video requests from client devices 106 by a proxy server 108, rather than requiring content managers 102, data servers 104 and/or content servers 112 to handle the video resource request. In some cases, such caching functionality may be entirely transparent to the client device 106, so that video resources that appear to the client device 106 to be retrieved from a remote server 102 may actually be received from a closer and more secure proxy server 108 over a faster local network.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for media/entertainment purposes, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their client device 106, location 107, video resources retrieved and played, and interactions with other client devices 106. This data may be stored and processed by the user data server 114, to support user tracking and analysis features. In the context of media distribution and interactive gaming, the user data server 114 may store and process resource access data for multiple users (e.g., content titles accessed, access times, data usage amounts, viewing/gaming histories, user devices and device types, etc.). The user data server 114 may also store user viewing patterns, user feedback, facial expression data, etc., received during video content delivery and playback.

Administrator server 116 may include hardware and software components to initiate various administrative functions at the content management server 102 and other components within the content distribution network 100. For example, the administrator server 116 may monitor device status and performance for the various servers, data stores, and/or client devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor video resource usage by users and devices 106, and perform analyses and generate reports on specific network users and/or devices (e.g., vide resource usage tracking reports, network usage/streaming data, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, satellite television provider networks, cable television networks, and/or any combination of these and/or other networks.

In some embodiments, a content distribution network 100 may include one or several navigation systems or features including, for example, the Global Positioning System ("GPS"), GALILEO, or the like, or location systems or features including, for example, one or several transceivers that can determine the locations of client devices 106 and/or other components of the content distribution network 100 via, for example, triangulation. All of these are depicted as navigation system 122. In some embodiments, this communication can include the transmission of a signal from the navigation system 122 which signal is received by one or several components of the content distribution network 100 and can be used to determine the location of the one or several components of the content distribution network 100.

Figure 2:
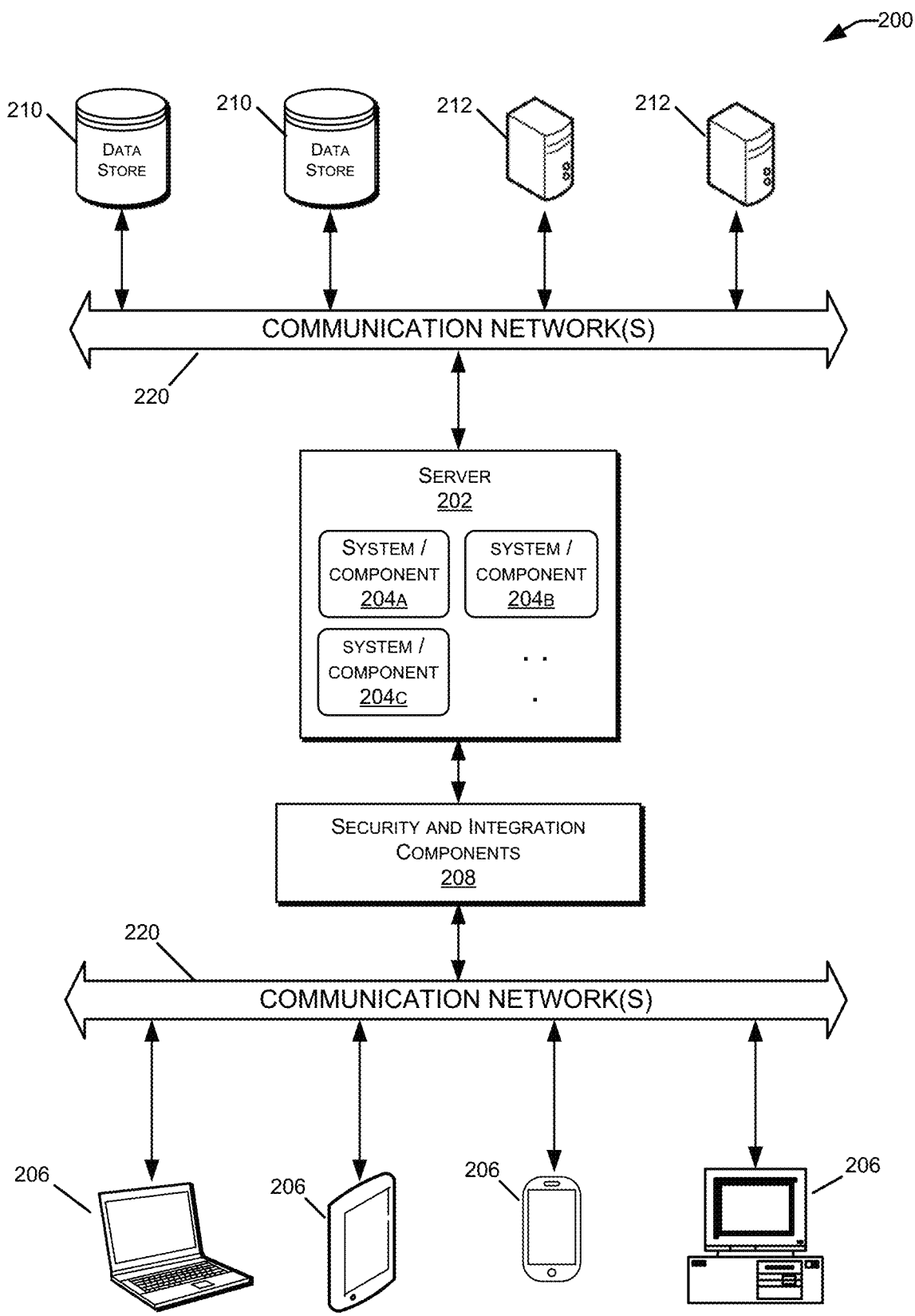
FIG. 2 is a block diagram illustrating a computer server and computing environment within a video distribution network, in accordance with certain embodiments of the present disclosure.

With reference now to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the client devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

Figure 3:
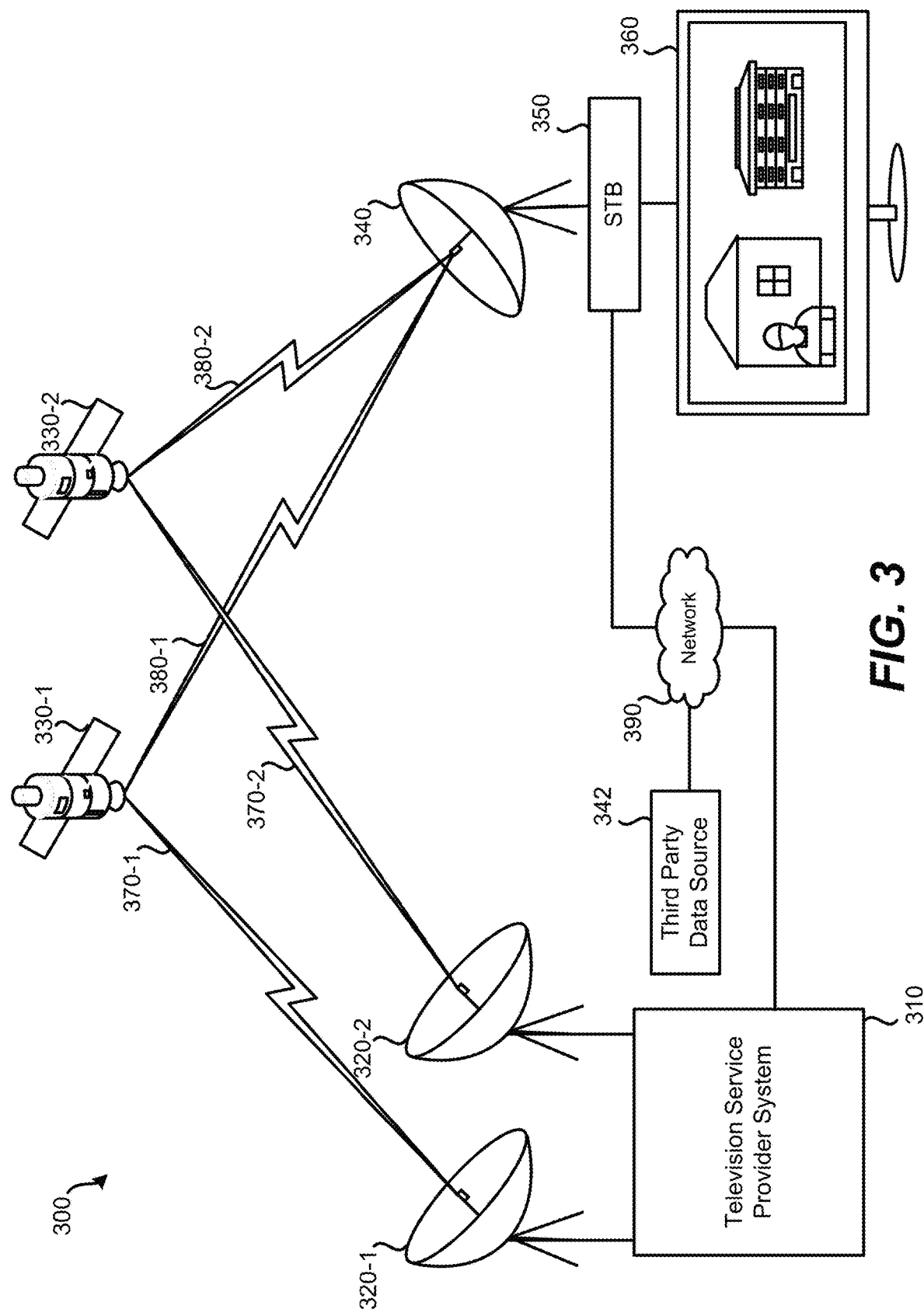
FIG. 3 illustrates a diagram of a satellite television distribution system, in accordance with certain embodiments of the present disclosure.

Referring now to FIG. 3, an embodiment of a satellite television distribution system 100, on which various aspects of the present disclosure may be implemented. For example, as discussed above, in some embodiments requests for video downloading and/or video streaming may be initiated from television client devices and served over a satellite television network. In such embodiments, a satellite television distribution system 300 may include: television service provider system 310, satellite transmitter equipment 320, satellites 330, satellite dish 340, set-top box 350, and television 360. Alternate embodiments of satellite television distribution system 300 may include fewer or greater numbers of components. While only one satellite dish 340, set-top box 350, and television 360 (collectively referred to as "user equipment") are illustrated, it should be understood that multiple (e.g., tens, thousands, millions) instances of user equipment may receive television signals from satellites 330.

Television service provider system 310 and satellite transmitter equipment 320 may be operated by a television service provider. A television service provider may distribute television channels, on-demand programing, programming information, and/or other services to users. Television service provider system 310 may receive feeds of one or more television channels from various sources. Such television channels may include multiple television channels that contain the same content (but may be in different formats, such as high-definition and standard-definition). To distribute such television channels to users, feeds of the television channels may be relayed to user equipment via one or more satellites via transponder streams. Satellite transmitter equipment 320 may be used to transmit a feed of one or more television channels from television service provider system 310 to one or more satellites 330. While a single television service provider system 310 and satellite transmitter equipment 320 are illustrated as part of satellite television distribution system 300, it should be understood that multiple instances of transmitter equipment may be used, possibly scattered geographically to communicate with satellites 330. Such multiple instances of satellite transmitting equipment may communicate with the same or with different satellites. Different television channels may be transmitted to satellites 330 from different instances of transmitting equipment. For instance, a different satellite dish of transmitting equipment 320 may be used for communication with satellites in different orbital slots.

Satellites 330 may be configured to receive signals, such as streams of television channels, from one or more satellite uplinks such as satellite transmitter equipment 320. Satellites 330 may relay received signals from satellite transmitter equipment 320 (and/or other satellite transmitter equipment) to multiple instances of user equipment via transponder streams. Different frequencies may be used for uplink signals 370 from transponder stream 380. Satellites 330 may be in geosynchronous orbit. Each satellite 330 may be in a different orbital slot, such that the signal path between each satellite, uplink stations, and user equipment vary. Multiple satellites 330 may be used to relay television channels from television service provider system 310 to satellite dish 340. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 330-1. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 340 may be a piece of user equipment that is used to receive transponder streams from one or more satellites, such as satellites 330. Satellite dish 340 may be provided to a user for use on a subscription basis to receive television channels provided by the television service provider system 310, satellite uplink 320, and/or satellites 330. Satellite dish 340 may be configured to receive transponder streams from multiple satellites and/or multiple transponders of the same satellite. Satellite dish 340 may be configured to receive television channels via transponder streams on multiple frequencies. Based on the characteristics of set-top box (STB) 350 and/or satellite dish 340, it may only be possible to capture transponder streams from a limited number of transponders concurrently. For example, a tuner of STB 350 may only be able to tune to a single transponder stream from a transponder of a single satellite at a time.

Figure 4:
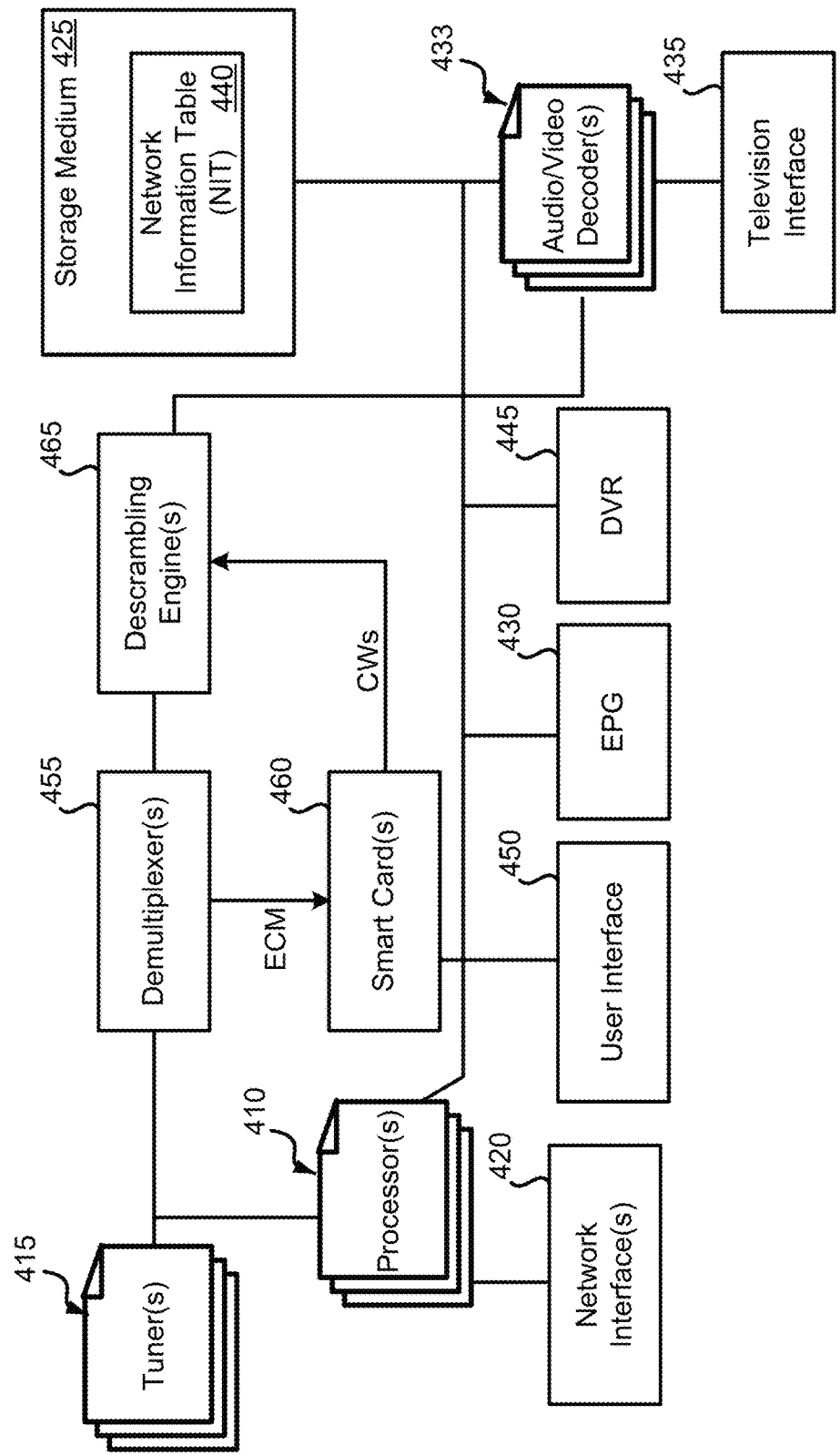
FIG. 4 illustrates a simplified diagram of a set-top box television receiver, in accordance with certain embodiments of the present disclosure.

In communication with satellite dish 340, may be one or more sets of receiving equipment. Receiving equipment may be configured to decode signals received from satellites 330 via satellite dish 340 for display on a display device, such as television 360. Receiving equipment may be incorporated as part of a television or may be part of a separate device, commonly referred to as a set-top box (STB). Receiving equipment may include a satellite tuner configured to receive television channels via a satellite. In FIG. 3, receiving equipment is present in the form of set-top box 350. As such, set-top box 350 may decode signals received via satellite dish 340 and provide an output to television 360. FIG. 4 provides additional detail of receiving equipment.

Television 360 may be used to present video and/or audio decoded by set-top box 350. Set-top box 350 may also output a display of one or more interfaces to television 360, such as an electronic programming guide (EPG). In some embodiments, a display device other than a television may be used.

Uplink signal 370-1 represents a signal between satellite uplink 320 and satellite 330-1. Uplink signal 370-2 represents a signal between satellite uplink 320 and satellite 330-2. Each of uplink signals 370 may contain streams of one or more different television channels. For example, uplink signal 370-1 may contain a certain group of television channels, while uplink signal 370-2 contains a different grouping of television channels. Each of these television channels may be scrambled such that unauthorized persons are prevented from accessing the television channels.

Transponder stream 380-1 represents a signal path between satellite 330-1 and satellite dish 340. Transponder stream 380-2 represents a signal path between satellite 330-2 and satellite dish 340. Each of transponder streams 380 may contain one or more different television channels in the form of transponder streams, which may be at least partially scrambled. For example, transponder stream 380-1 may include a first transponder stream containing a first group of television channels, while transponder stream 380-2 may include a second transponder stream containing a different group of television channels. A satellite may transmit multiple transponder streams to user equipment. For example, a typical satellite may relay 32 transponder streams via corresponding transponders to user equipment. For clarity, it should be noted that satellites carry many transponders, and transponders may carry a single multiplexed transport stream containing many PIDs. A service consists of one or more PIDs for audio, video, and data on that multiplexed transport stream.

FIG. 3 illustrates transponder stream 380-1 and transponder stream 380-2 being received by satellite dish 340. For a first group of television channels, satellite dish 340 may receive a transponder stream of transponder stream 380-1; for a second group of channels, a transponder stream of transponder stream 380-2 may be received. STB 350 may decode the received transponder stream. As such, depending on which television channel(s) are desired, a transponder stream from a different satellite (or a different transponder of the same satellite) may be accessed and decoded by STB 350. Further, while two satellites are present in satellite television distribution system 300, in other embodiments greater or fewer numbers of satellites may be present for receiving and transmitting transponder streams to user equipment.

Network 390 may serve as a secondary communication channel between television service provider system 310 and set-top box 350. Via such a secondary communication channel, bidirectional exchange of data may occur. As such, data may be transmitted to television service provider system 310 via network 390. Data may also be transmitted from television service provider system 310 to STB 350 via network 390. Network 390 may be the Internet. While audio and video services may be provided to STB 350 via satellites 330, feedback from STB 350 to television service provider system 310 may be transmitted via network 390. In some embodiments, STB 350 may be communicatively coupled via the network 390 with one or more third party data sources 342. The one or more third party data sources 342 may provide third party reference data, which will be discussed further herein.

FIG. 3 illustrates an example of a satellite-based television channel distribution system. It should be understood that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems.

Referring now to FIG. 4, a block diagram is shown illustrating an embodiment of a set-top box 400. STB 400 may be set-top box 150 of FIG. 1, or may be incorporated as part of a television, such as television 160 of FIG. 1. STB 400 may include: processors 410, tuners 415, network interfaces 420, non-transitory computer-readable storage medium 425, electronic programming guide (EPG) 430, television interface 435, networking information table (NIT) 440, digital video recorder (DVR) 445, user interface 450, demultiplexer 455, smart card 460, and/or descrambling engine 465. In other embodiments of STB 400, smaller or greater numbers of components may be present. Various embodiments of STB 400 may include any suitable number of tuners 415 and attendant components, such as decoders 433, to facilitate various features disclosed herein. For example, various embodiments may include up to eight or more—any suitable number—of tuners 415 to facilitate embodiments of the present disclosure. It should be understood that the various components of STB 400 may be implemented using hardware, firmware, software, and/or some combination thereof. For example, EPG 430 may include software instructions to be executed by processors 410.

Processors 410 may include one or more general-purpose processors configured to perform processes such as commanding a tuner, demodulator, demultiplexer, descrambling engine, and audio video decoders to tune to a particular channel, displaying the EPG, and/or receiving and processing input from a user. Processors 410 may include one or more special purpose processors. For example, processors 410 may include one or more processors dedicated to decoding video signals from a particular format, such as MPEG, for output and display on a television and for performing decryption. It should be understood that the functions performed by various modules of FIG. 4 may be performed using one or more processors. As such, for example, functions of descrambling engine 465 may be performed by processor 410 in some embodiments. In some embodiments, functions performed by various modules such as descrambling engine 465 may be performed using one or more dedicated processors.

Tuners 415 may include one or more tuners used to facilitate tuning to television channels, such as television channels transmitted via satellite or cable. Each tuner contained in tuners 415 may be capable of receiving and processing one or more streams of data from a satellite transponder (or a cable RF channel) at a given time. As such, a single tuner may tune to one transponder (or cable RF channel). If tuners 415 include multiple tuners, one tuner may be used to tune to a television channel on a first transponder for display using a television, while one or more tuners of the set-top box may be identified that are idle. For example, if the set-top box has four tuners, the three tuners not being used to tune to the first television channel may be idle. An idle tuner may be defined as a tuner that is not being used to receive a transponder stream for presentation of a television channel via a presentation device or for recording of a television channel. An idle tuner may be used to tune to a television channel on a second transponder for recording and viewing at some other time. If multiple television channels transmitted on the same transponder stream are desired, a single tuner of tuners 415 may be used to receive the signal containing the multiple television channels for presentation and/or recording in some embodiments. Additionally or alternatively, the availability of audio/video decoding resources may be determined. For example, the number of audio/video decoder submodules 433 that are idle may be determined. An audio/video decoder submodule may be defined as idle when the audio/video decoder submodule is not being used to decode video and/or audio received from a DVR or descrambling engine.

Network interface(s) 420 may be used to communicate via an alternate communication channel with a television service provider. For example, the primary communication channel may be via satellite (which may be unidirectional to the STB) and the alternate communication channel (which may be bidirectional) may be via a network, such as the Internet. Network interface(s) 420 may include a modem interface, as a STB may include a modem in some embodiments, as well other interfaces described herein. Referring back to FIG. 1, STB 150 may be able to communicate with television service provider system 110 via a network, such as the Internet. This communication may be bidirectional: data may be transmitted from STB 150 to television service provider system 110 and from television service provider system 110 to STB 150. Referring back to FIG. 4, network interface 420 may be configured to communicate via one or more networks, such as the Internet, to communicate with television service provider system 110 of FIG. 1 and other information sources. Information may be transmitted and/or received via network interface(s) 420.

Storage medium 425 may represent a non-transitory computer readable storage medium. Storage medium 425 may include memory and/or a hard drive. Storage medium 425 may be used to store information received from one or more satellites and/or information received via network interface 420. Storage medium 425 may store information related to EPG 430, NIT 440, and/or DVR 445. DVR 445 may include software instructions, stored on the storage medium 425, to be executed by the processor(s) in order to provide DVR functions. Additionally, recorded television programs may be stored using storage medium 425.

EPG 430 may include software instructions to be executed by the processor(s) in order to provide EPG functions and rendering of data. EPG 430 may store information related to television channels and the timing of programs appearing on such television channels. In some embodiments, EPG 430, including software instructions and EPG data, may be stored using non-transitory storage medium 425, which may be a hard drive. EPG 430 may be used to inform users of what television channels or programs are popular and/or provide recommendations to the user. EPG 430 may provide the user with a visual interface displayed by a television that allows a user to browse and select television channels and/or television programs for viewing and/or recording via DVR 445. Information used to populate EPG 430 may be received via network interface 420 and/or via satellites, such as satellites 130 of FIG. 1 via tuners 415. For instance, updates to EPG 430 may be received periodically via satellite. EPG 430 may serve as an interface for a user to control DVR 445 to enable viewing and/or recording of multiple television channels simultaneously.

One or more audio/video decoders 433 may serve to convert encoded video and audio into a format suitable for output to a display device. For instance, audio/video decoder 433 may receive MPEG video and audio from storage medium 425 or descrambling engine 465 to be output to a television. Audio/video decoder 433 may convert the MPEG video and audio into a format appropriate to be displayed by a television or other form of display device and audio into a format appropriate to be output from speakers, respectively. The number of audio/video decoders 433 may or may not correspond to the number of tuners 415 in certain embodiments.

Television interface 435 may serve to output a signal to a television (or another form of display device) in a proper format for display of video and playback of audio. As such, television interface 435 may output one or more television channels, stored television programing from storage medium 425 (e.g., DVR 445 and/or information from EPG 430) to a television for presentation.

The network information table (NIT) 440 may store information used by set-top box 400 to access various television channels. NIT 440 may be stored using storage medium 425. Information used to populate NIT 440 may be received via satellite (or cable) through tuners 415 and/or may be received via network interface 420 from the television service provider. As such, information present in NIT 440 may be periodically updated. NIT 440 may be locally-stored by STB 400 using storage medium 425. Information that may be present in NIT 440 may include: television channel numbers, a satellite identifier, a frequency identifier, a transponder identifier, an ECM PID, one or more audio PIDs, and a video PID. (A second audio PID of a channel may correspond to a second audio program (SAP), such as in another language.) In some embodiments, NIT 440 may be divided into additional tables. For example, rather than the specific audio PIDs and video PIDs being present in NIT 440, a channel identifier may be present within NIT 440 which may be used to lookup the audio PIDs and video PIDs in another table.

Table 1 provides a simplified example of NIT 440 for several television channels. It should be understood that in other embodiments, many more television channels may be represented in NIT 440. NIT 440 is periodically updated by a television service provider. As such, television channels may be reassigned to different satellites and/or transponders, and STB 400 may be able to handle this reassignment as long as NIT 440 is updated.

TABLE 1

| Channel | Satellite | Transponder | ECM PID | Audio PIDs | Video PID |
|---|---|---|---|---|---|
| 4 | 1 | 2 | 27 | 1001 | 1011 |
| 5 | 2 | 11 | 29 | 1002 | 1012 |
| 7 | 2 | 3 | 31 | 1003 | 1013 |
| 13 | 2 | 4 | 33 | 1003, 1004 | 1013 |

It should be understood that the values provided in Table 1 are for example purposes only. Actual values, including how satellites and transponders are identified, may vary. Additional information may also be stored in NIT 440. Video and/or audio for different television channels on different transponders may have the same PIDs. Such television channels may be differentiated based on which satellite and/or transponder to which a tuner is tuned.

Digital Video Recorder (DVR) 445 may include software instructions and/or data stored on storage medium 425. DVR 445 permit a television channel to be recorded for a period of time. DVR 445 may store timers that are used by processors 410 to determine when a television channel should be tuned to and recorded to DVR 445 of storage medium 425. In some embodiments, a limited amount of storage medium 425 may be devoted to DVR 445. Timers may be set by the television service provider and/or one or more users of the STB. DVR 445 may be configured by a user to record particular television programs. Whether a user directly tunes to a television channel or DVR 445 tunes to a first television channel, NIT 440 may be used to determine the satellite, transponder, ECM PID (packet identifier), audio PID, and video PID.

User interface 450 may include a remote control (physically separate from STB 400) and/or one or more buttons on STB 400 that allows a user to interact with STB 400. User interface 450 may be used to select a television channel for viewing, view EPG 430, and/or program DVR 445.

Referring back to tuners 415, television channels received via satellite (or cable) may contain at least some scrambled data. Packets of audio and video may be scrambled to prevent unauthorized users (e.g., nonsubscribers) from receiving television programming without paying the television service provider. When a tuner of tuners 415 is receiving data from a particular transponder of a satellite, the transponder stream may be a series of data packets corresponding to multiple television channels. Each data packet may contain a packet identifier (PID), which in combination with NIT 440, can be determined to be associated with particular television channel. Particular data packets, referred to as entitlement control messages (ECMs), may be periodically transmitted. ECMs may be encrypted; STB 400 may use smart card 460 to decrypt ECMs. Decryption of an ECM may only be possible if the user has authorization to access the particular television channel associated with the ECM. When an ECM is received by demultiplexer 455 and the ECM is determined to correspond to a television channel being stored and/or displayed, the ECM may be provided to smart card 460 for decryption.

When smart card 460 receives an encrypted ECM from demultiplexer 455, smart card 460 may decrypt the ECM to obtain some number of control words. In some embodiments, from each ECM received by smart card 460, two control words are obtained. In some embodiments, when smart card 460 receives an ECM, it compares the ECM to the previously received ECM. If the two ECMs match, the second ECM is not decrypted because the same control words would be obtained. In other embodiments, each ECM received by smart card 460 is decrypted; however, if a second ECM matches a first ECM, the outputted control words will match; thus, effectively, the second ECM does not affect the control words output by smart card 460.

When an ECM is received by smart card 460, it may take a period of time for the ECM to be decrypted to obtain the control words. As such, a period of time, such as 2 seconds, may elapse before the control words indicated by the ECM can be obtained. Smart card 460 may be permanently part of STB 400 or maybe configured to be inserted and removed from STB 400.

Demultiplexer 455 may be configured to filter data packets based on PIDs. For example, if a transponder data stream includes multiple television channels, data packets corresponding to a television channel that is not desired to be stored or displayed by the user, may be ignored by demultiplexer 455. As such, only data packets corresponding to the one or more television channels desired to be stored and/or displayed may be passed to either descrambling engine 465 or smart card 460; other data packets may be ignored. For each channel, a stream of video packets, a stream of audio packets and/or a stream of ECM packets may be present, each stream identified by a PID. In some embodiments, a common ECM stream may be used for multiple television channels. Additional data packets corresponding to other information, such as updates to NIT 440, may be appropriately routed by demultiplexer 455. It should be understood that, in some embodiments, all peripherals may communicate with main memory (RAM)/DRAM when communicating with other components.

Descrambling engine 465 may use the control words output by smart card 460 in order to descramble video and/or audio corresponding to television channels for storage and/or presentation. Video and/or audio data contained in the transponder data stream received by tuners 415 may be scrambled. The video and/or audio may be descrambled by descrambling engine 465 using a particular control word. Which control word output by smart card 460 to be used for successful descrambling may be indicated by a scramble control identifier present within the data packet containing the scrambled video or audio. Descrambled video and/or audio may be output by descrambling engine 465 to storage medium 425 for storage (via DVR 445) and/or to audio/video decoder 433 for output to a television or other presentation equipment via television interface 435 or both.

For simplicity, STB 400 of FIG. 4 has been reduced to a block diagram, commonly known parts, such as a power supply, have been omitted. Further, some routing between the various modules of STB 400 has been illustrated. Such illustrations are for exemplary purposes only. Two modules not being directly or indirectly connected does not indicate the modules cannot communicate. Rather, connections between modules of the STB 400 are intended only to indicate possible common data routing. It should be understood that the modules of STB 400 may be combined into a smaller number of modules or divided into a greater number of modules. Further, the components of STB 400 may be part of another device, such as built into a television. Also, while STB 400 may be used to receive, store, and present television channels received via a satellite, it should be understood that similar components may be used to receive, store, and present television channels via a cable network.

Figure 5:
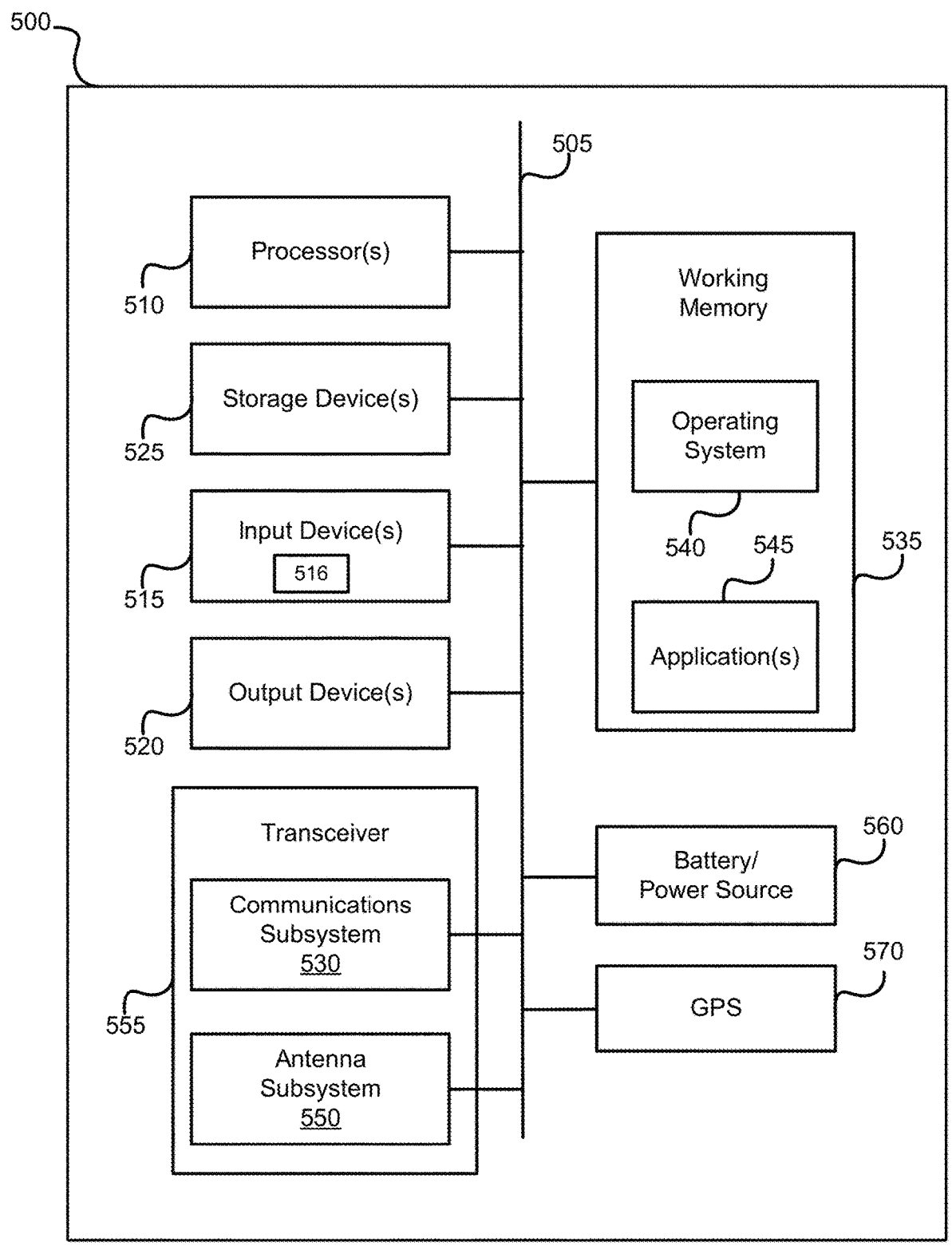
FIG. 5 is an illustration of an embodiment of a computing device that may perform the methods provided by various embodiments, in accordance with certain embodiments of the present disclosure.

Referring now to FIG. 5, an example is shown of a computing system 500 on which various aspects of the disclosure may be implemented. The computing system 500 may correspond to one or more of client devices 106, 206, 350, and/or 360 which may request, retrieve, and play video resources from remote servers over one or more communication networks. In some embodiments, a client device 500 may be a mobile device 106 such as smartphone, tablet computer, personal digital assistant, and/or a wearable computing device. In other embodiments, client device 500 may be other computing devices such as desktop computers, laptop computers, tablet computers, and/or other electronic devices. In still other examples, client devices 500 may correspond to television equipment such as set-top boxes 350, televisions 360 and/or other electronic displays.

According to one or more aspects, a computer system 500 as illustrated in FIG. 5 may be incorporated as part of a computing device, which may implement, perform, and/or execute any and/or all of the features, methods, and/or method steps described herein. For example, computer system 500 may represent some of the components of a mobile device. The mobile device can be connected to a wireless interface and/or a network interface. Examples of mobile devices include but are not limited to video game consoles, tablets, smart phones, and human-wearable or human-embedded or electronic devices. In some embodiments, the computing system 500 may be configured to implement the features and functionality of client devices 106, 206, and/or 350/360 described above. FIG. 5 provides a schematic illustration of one embodiment of a computer system 500 that may perform the methods provided by various other embodiments, as described herein, and/or can function as the back-end computer server, a remote data store server, a set-top box, and/or other computer system. FIG. 5 is meant only to provide a generalized illustration of various components, any and/or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). In one embodiment, the bus 505 can be used for the processor 510 to communicate between cores and/or with the memory 535. The hardware elements may include one or more processors 510, including without limitation one or more general-purpose processors and/or one or more special-purpose processors (such as digital signal processing chips, graphics acceleration processors, and/or the like); one or more input devices 515, and one or more output devices 520.

The computer system 500 may further include (and/or be in communication with) one or more non-transitory storage devices 525, which can comprise, without limitation, local and/or network accessible storage, and/or can include, without limitation, memory devices, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 500 might also include a communications subsystem 530, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. According to one embodiment of the present invention, a receiver and GNSS receiver may be examples of a communication subsystem 530. The communications subsystem 530 may permit data to be exchanged with one or more communication networks (such as the networks described herein), other computer systems, and/or any other devices described herein. In many embodiments, the computer system 500 may further comprise a non-transitory working memory 535, which can include a RAM or ROM device, as described above.

When computing system 500 corresponds to a mobile client device, the communications subsystem 530 may be linked to an antenna subsystem 550 which may comprise a single antenna, multiple antennas or an antenna array. Antenna subsystem may be used to communicate wirelessly—e.g. according to signaling for GSM, WCDMA, LTE, CDMA2000 and/or WiFi IEEE 802.11—by entities such as client devices 106 or 206, back-end servers 102 and/or terrestrial wireless transceiver 200. Such wireless communication may enable reception of obfuscated locations and other information by a preferred mobile device 116. According to some embodiments, communication subsystem 930 and antenna subsystem 950 can be used as a transceiver 555 to communicate wirelessly (e.g., receive/transmit data).

In some embodiments, the power source 560 of the computer system 500 may be a battery (e.g., for mobile client devices 106 or 206). Additionally or alternatively, the power source 560 may AC power (e.g., 420V, 240V, and/or 250V) and/or DC power (e.g., power from a USB cable and/or a battery or batteries), depending on the type and characteristics of the client computer system 500. In some embodiments, power source 516 is a battery that can be recharged wirelessly, for example when the battery is within range or a wireless recharging component. In some embodiments, a battery compartment associated with the battery 560 may holds one or more batteries as a power source for the client device 500 (e.g., AAA, AA, C, D, button cell, lithium, etc.). In some embodiments, the device 500 may further comprise one or more solar panels to completely or partially power the device 500.

The computer system 500 also may comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed in relation to the following process flow diagrams might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 500) to perform methods in accordance with the disclosure. For example, some or all of the procedures of the described methods may be performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the storage device(s) 525. Merely by way of example, execution of the sequences of instructions contained in the working memory 535 might cause the processor(s) 510 to perform one or more procedures of the methods described herein, for example one or more of the elements of the method described with respect to the process flow diagrams below.

As noted above, computer system 500 may correspond to a client devices 500 configured to request, receive, and playback video resources. Such client devices may include laptop computers, smartphones, tablet computers, and other various types of mobile devices, each of which may include some or all of the hardware, software, and networking components discussed above. Specifically, a mobile device 500 may be any computing device with sufficient memory for storing one or more content resources, and sufficient processing and I/O subcomponents for requesting and executing video resources. As discussed above, such video resources may include television programming, music, movies, educational video materials and/or gaming content. Accordingly, mobile devices 500 may include the necessary hardware and software components to establish the network interfaces, security and authentication capabilities, and content caching capabilities to receive the content, store the content, and execute the content to provide to users in real-time or at later time. Moreover, in certain embodiments, a single mobile device 500 may have different context data (e.g., location data, network connectivity status data, movement and noise data, etc.) during different content resource execution sessions. Laptop computers, tablet computers, smart phones, smart watches, wearable computing devices, and vehicle-based computing systems are all examples of mobile devices 500 that may change locations and network connectivity status, may detect movement and noise data, and may have other changing context data during a single content resource execution session or between multiple different execution sessions.

For mobile client devices 500, the input subsystems 515 and output subsystems 520 may include the I/O hardware and software components to support a specific set of output capabilities (e.g., LCD display screen characteristics, screen size, color display, video driver, speakers, audio driver, graphics processor and drivers, etc.), and a specific set of input capabilities (e.g., keyboard, mouse, touchscreen, voice control, cameras, facial recognition, gesture recognition, etc.). Output devices 520 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 520 may include, without limitation, a variety of display devices that visually convey text, graphics and audio/video information such as monitors, printers, speakers, headphones, automotive navigation systems, plotters, voice output devices, and modems.

It should be understood that different mobile devices 500 may support different input and output capabilities within their I/O subsystems 515-520, and thus different types of content resources may be compatible or incompatible with certain mobile devices 500. For example, certain content resources may require specific types of processors, graphics components, and network components in order to be optimally executed on a mobile device 500. Additionally or alternatively, various content resources may require specific output capabilities (e.g., LCD display screens, minimum screen sizes, color displays, video, audio, graphics, etc.) and/or specific input capabilities (e.g., keyboard, mouse, touchscreen, voice control, gesture recognition, etc.) in order to be optimally executed on a mobile device 500. In some embodiments, users may establish user-specific preferences for executing specific types of content resources on specific types of user devices.

Additionally, the input devices/systems 515 of mobile client devices 500 may include one or more device sensors 516 configured to detect context data associated with specific video retrieval requests and playback/execution sessions. Context data may include any data describing the current (and/or previous) state of the mobile device 500, the physical environment of the mobile device 500, and/or the user of the mobile device 500, at the time of a request for a video resource. For example, such context data may include the location of the mobile device 500 and any detected movement of the mobile device 500 during a video resource request, including speed and overall distance traveled, as well jiggling and vibrating movements indicative of walking, jogging, running, or traveling in cars, busses, or trains, etc. Accordingly, sensors 516 may include accelerometers, speedometers, compasses, gyroscopes, and/or digital positioning systems such as Global Position Satellite (GPS) receivers 570, in order to detect the position and movement of the device 500 during an video streaming session. Additional context data may include the orientation of the mobile device 500, ambient light, noise and/or visual background data detected by the device 500, and temperature and lighting data within the physical environment of the mobile device 500 during a video streaming session. Thus, sensors 516 also may include thermometers, barometers, light sensors, cameras, microphones, heat sensors, motion sensors, and the like, in order to detect background noises such as traffic, music, conversations, and other potential distractions (e.g., other people nearby, animals, etc.), as well as lighting and temperature factors that may affect performance during an execution session.

Figure 6:
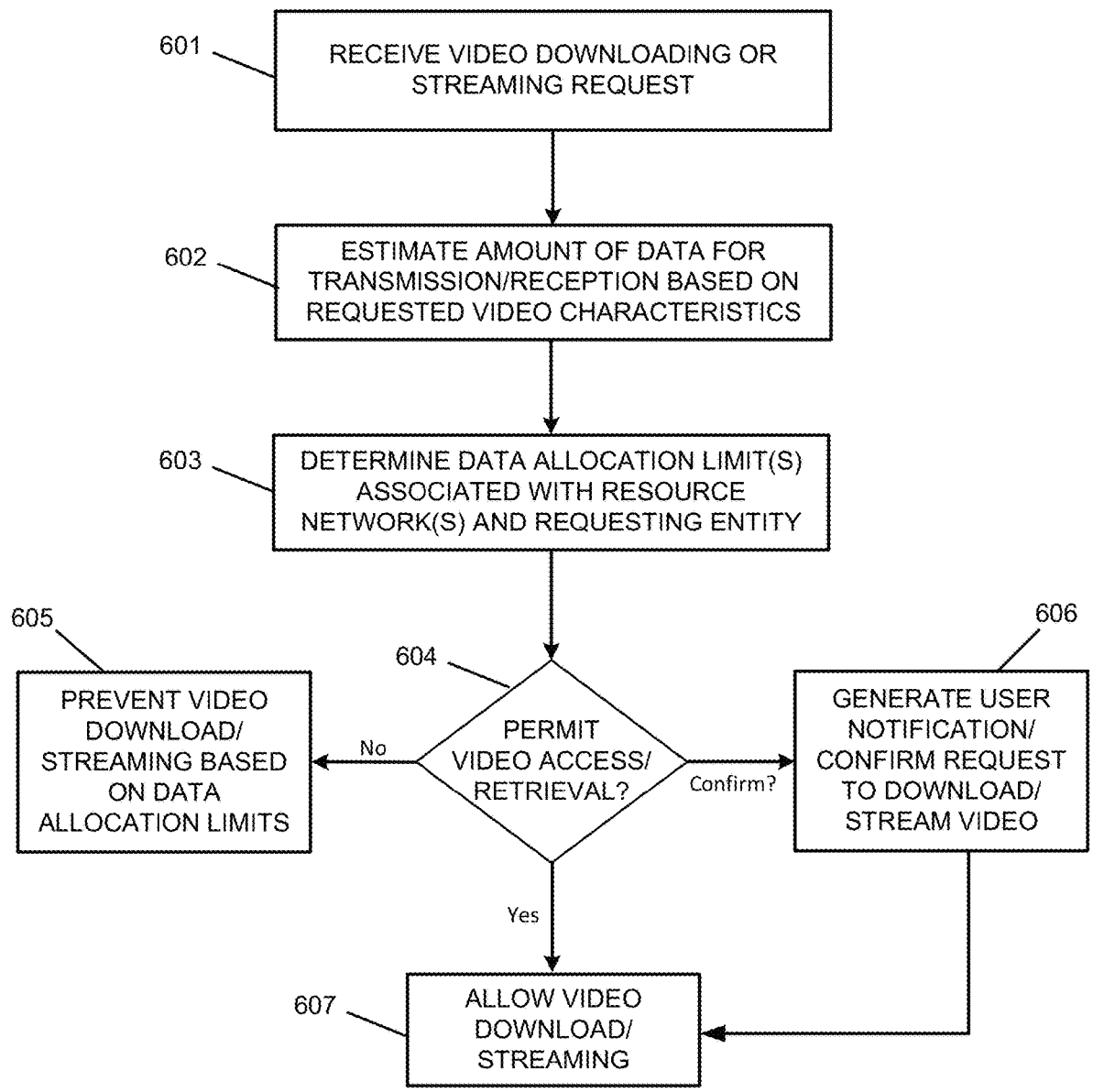
FIG. 6 is a flow diagram illustrating an example process of handling requests for video streaming and downloading, based on estimated data requirements and data allocation limits, in accordance with certain embodiments of the present disclosure.

Referring now to FIG. 6, a flow diagram is shown illustrating an example process of handling requests at client devices for video streaming and downloading, based on estimated data requirements and data allocation limits. In some embodiments, the steps 601-607 in this example may be performed by a client computing device 500, in response to a request initiated by a user of the client device to retrieve one or more video resources from a remote location.

In step 601, a request is initiated at a client device 500 to retrieve a video resource from a remote storage location. In some examples, the request in step 601 may correspond to video streaming request, that is, a request to initiate the retrieval and streaming of the video for immediate real-time playback on the client device 500. In other examples, the request might correspond to a request to download and store the video resource on the client device 500 for subsequent playback at a later time. As discussed above, the techniques and concepts illustrated herein may apply to many different types of video resources, different client devices, different back-end servers, which may be retrieved over different intermediary computer networks. For example, in some embodiments, the request in step 601 may be initiated by a user action, such as the selection of a video via a media distribution application or online streaming service, the selection of a movie via an video-on-demand (VOD) service of a satellite or cable provider, or in response to a user selecting a video link via a web browser (or activating an embedded video on a web page) at a social media website, video sharing website, etc. In other cases, the request in step 601 may be initiated may an automated process at the client device 500.

In some cases, the client device 500 at which the request is initiated in step 601 may be mobile device (e.g., 106 or 206), such as a smart phone, tablet or laptop computer, portable gaming system, or a human-wearable or human-embedded or electronic device. Alternatively or additionally, the requested in step 601 may be initiate via a personal computing device 206 (e.g., home or work desktop device), or a television 360 via a set-top box 350 or other television receiver device. Similarly, the remote location from which the video resource is requested may correspond to a web server or other back-end computer server (e.g., content management server 102), or alternatively may correspond to a television service provider of a satellite network (e.g., system 310) or a cable television network.

The communication network(s) over which the video resource may be retrieved, based on the request in step 601, may include the Internet, local area networks (LANs), other wide area networks (WANs), corporate networks, and various other IP networks, as well as satellite networks (e.g., 370-380), cable television networks, and/or cellular/mobile networks. This particular network (or combination of networks) over which a video resource may be retrieved may depend on the particular device used, the current location and network connectivity status of the device, and/or type video resource request. VOD requests from set-top boxes 350 may generally be requested and retrieved over the corresponding television service provider network (e.g., 370-380), while web-based videos may be requested and retrieved over IP-networks (e.g., 120). In some cases, video resources to be transmitted to a client device 106 from a remote server 120 may need to traverse multiple networks, such as a first satellite, cable, or IP network, followed by a second local network (e.g., a wireless LAN, corporate network, etc.). Further, in some embodiments, multiple different options may existing for network paths, such as when a mobile device 106 may retrieve the same video resource from the same back-end server or service, via a cellular network or a WiFi network. In these various examples, for the purposes of estimating the amount of data required to transmit the video to the client device (step 602) and determining data allocation limits (steps 603), the client device 500 may take into account all networks and/or all combinations of networks over which the video resource may potentially be transmitted.

In step 602, the client device 500 may determine one or more estimates of the amount of data required to be transmitted over the network (or over multiple networks) in order to retrieve the requested video resource. In some examples, when requesting a multimedia video file for retrieval from a remote server, the client device 500 may request the size of the video file from the remote server (and/or a related video service or application). In other examples, when requesting that a video be streamed from a remote source (e.g., via a streaming service or video sharing website), the total transmission size required for the streaming may be generally based on the length of the video, and on the video quality of the video segments transmitted during the streaming process (e.g., measured by bit rate). Accordingly, in some embodiments, the determination in step 602 may be performed based on the video characteristics (e.g., file size, or video length and streaming bit-rate).

However, in certain implementations of video distribution systems (e.g., 100, 300), the overall amount of data that will be transmitted in providing the video to the client device 500 may be based on additional characteristics of the client device 500, the front-end application, the communication networks and/or protocols to be used to retrieve the video. For instance, the particular network transmission protocols used, including the techniques for chunking and encapsulating the data blocks, may affect the overall transmission size. Additional security layers within the network protocols, as well as scrambling and/or encryption, also may increase the total payload size and thus increase the overall amount of data transmission required to stream or the download the video resource to the client device 500. Some of these additional characteristics may be determined from the client device 500 (e.g., based on the front-end application/service used to request the video), or by requesting/requiring certain transmission characteristics from the remote server 120, while other additional characteristics might be determined by interacting with the communication networks, for example, to determine the overhead of the network protocols, the security features, types of encryption, and the like, which may affect the overall network transmission overhead. In some embodiments, if the client device 500 determines in step 602 that some or all of the requested video is cached locally at the client device 500, in another local client device (e.g., 106) at the same location (e.g., 107), or in an accessible proxy server 108 or the like, then the client device 500 may determine that the cache portions of the video resource may be retrieved readily from the cache without requiring transmission of the video data from the remote storage location over the network.

In step 603, the client device 500 (e.g., 106, 206, 350, etc.) may determine one or more data allocation limits associated with one or more entities requesting the video resource, and with one or more networks over which the requested video may be streamed/transmitted. Data allocation limits, which also may be referred herein to as data quotas, may represent limits on the amount of data that can be requested and received over a particular communication network, over a particular length of time. For example, user network accounts may have monthly data quotas applicable to video data and/or all other data types. If the amount of data streamed or downloaded over the network during the month time period exceeds the user's monthly quota, then the user may be charged an excess data penalty, and/or the network provider may restrict or block the user's access to the network after the user's quota has been reached.

The data allocation limits/quotas determined in step 603 may be specific to a particular entity associated with the video resource request. The entity to which the quota applies may be, for example, the individual user that initiated the video request, or the particular client device 500 from which the request was initiated. For instance, a first user may have a first data quota on a communication network, while a second user may have second data quota on the same network (even when the second user is using the same client device 500, same household or account, same local network, etc.). In other cases, a particular client device 500 (e.g., a particular mobile phone, tablet, set-top box, etc.) may have a first network data quota, while a second client device 500 has a separate network data quota, even though both devices may be operated by the same user, within the same household or location 107, over the same WiFi or LAN, etc. In other cases, different quotas may be applied to any predetermined group of users and/or client devices. In still other examples, a quota for network data usage may be associated with a particular location 107 (e.g., a household, office, LAN, etc.), so that the quota applies to all data retrieved over the network at that location 107, regardless of the particular client device or user requesting the data. In other examples, a network data quota may be associated with a particular account and/or login credentials, so that the quota applies to data retrieved following an authorized account login, regardless of the client device 106, the particular user, or the location 107 from which the data was received over the network. In some embodiments, quotas for network data usage may potentially be defined for any possible combination of users, client devices, locations, and/or accounts/credentials.

Additionally, the data quotas discussed above may be established for any these entities (or any combination of entities), by any of the various communication networks discussed herein. For instance, a satellite television network 370 may establish data quotas for particular entities, while a cable television network, an IP network provider (e.g., Internet provider), and cellular network provider may establish its own separate data quotas for the same entities or combinations of entities.

In some cases, quotas for network data usage may be established and maintained by the network providers themselves. Thus, information about the data quotas may be stored in a the back-end computer server of the network provider, and in step 603, the client device 500 may contact the appropriate back-end computer server to request the appropriate network data quota for the entity (or entities) that requested the video resource, as well as the current status of the entity's network usage measured against the quota within the current time period. In other cases, data quotas for various communication networks may be established by and/or stored and maintained directly on the client device 500, or other local device (e.g., an STB or wireless modem installed at the location 107 from which the video request was made). In these cases, the client device 500 need not contact any other remote server to retrieve the network data quota information in step 603, but instead may retrieve the appropriate quotas (and current status of those quotas) from its own storage or a local device based on the entity requesting the video and the network over which the video was requested.

In step 604, the client device 500 may determine whether or not to permit the downloading or streaming of the video requested in step 601, based on the amount of data required to download or stream the requested video (step 602) and based on the data quotas determined for the requesting entity over the applicable network (step 603). In some embodiments, the client device 500 may simply compare the required amount of data to download/stream the requested video to the appropriate network data quota. If the required amount of data will exceed the entity's network data quota, then the client device 500 might prevent the retrieval of the requested video resource, as shown in step 605. Alternatively, the client device 500 may present a warning notification via a user interface on the client device 500, and may require user confirmation via the user interface before proceeding with the retrieval of the requested video resource, as shown in step 606.

In other embodiments, the client device 500 may compare the amount of data required to stream/download the video to multiple different thresholds. For instance, if the required amount of data would exceed the entity's quota, then the client device 500 may prevent the retrieval in step 605. However, if the required amount of data would not exceed the entity's quota, but would approach the quota and/or would put the entity on track for exceeding the quota within the time period to which the quota applies, then the client device 500 may present the warning notification in step 606. Alternatively, if the amount of data required to stream/download the video would neither exceed nor approach the entity's network quota, then the client device 500 may continue with the retrieval of the requested video resource in step 607, without any additional confirmation or input from the user. Although this example illustrates three possible processing paths following the evaluation in step 604 (i.e., and thus at least two different thresholds and/or determinations based on the estimated data amount are performed in step 604), it should be understood that other implementations may allow for only two possible processing paths (e.g., where only single threshold and/or determination may be evaluated in step 604), such as a single determination between the prevent 605 and allow 607 paths, or a single determination between the confirm 606 and allow 607 paths, etc. In still other implementations, the client device 500 may be configured to allow for more than three possible processing paths 605-607, wherein different processing paths correspond to different levels/types of warnings, different user options for the video retrieval (e.g., partial retrieval, changing network or entity, different required authorizations (e.g., parental, admin, and/or user, etc.) and the like.

Figure 7A:
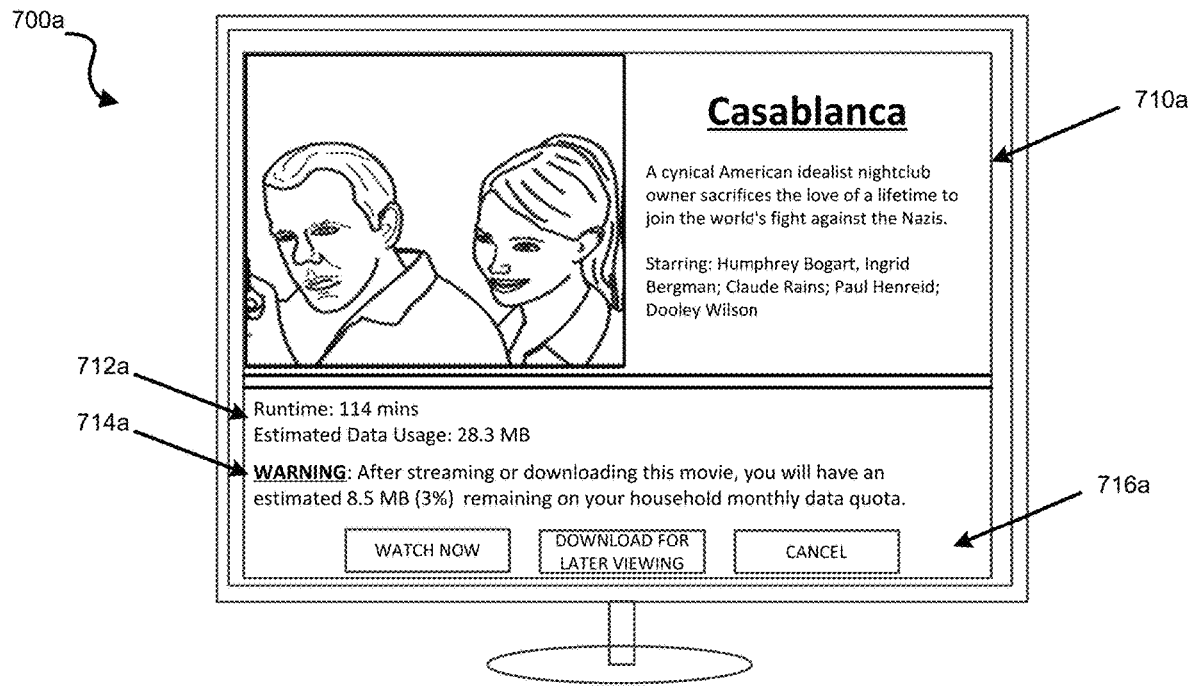
FIGS. 7A and 7B are two example user interface displays generated in response to video streaming or downloading requests, in accordance with certain embodiments of the present disclosure.
Figure 7B:
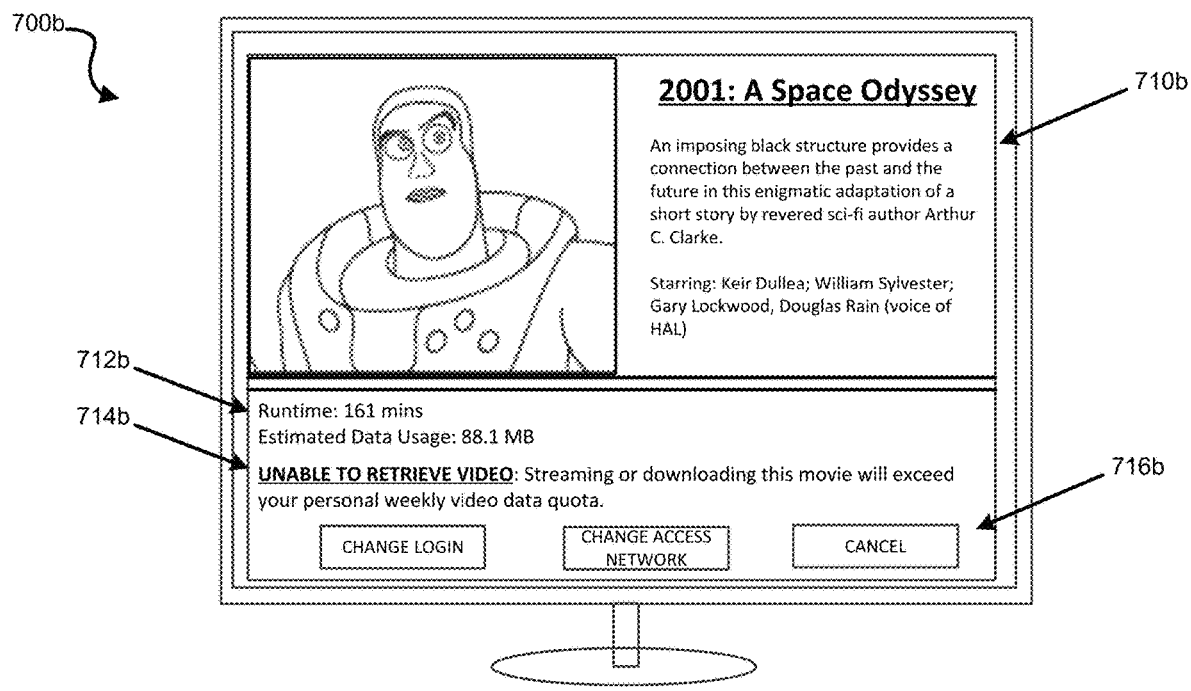

Referring now to FIGS. 7A and 7B, two user interface screens are shown illustrative of the possible processing paths that a client device 500 may perform in response to a comparison in step 604 between a determined amount of data required to download or stream a requested video, and one or more data quotas associated with the requesting entity and the relevant communication network(s). FIG. 7A, for example, shows a confirmation screen 700*a*, generated in step 606, in which the user is presented with a warning notification indicating that the amount of data required to download or stream the requested video will approach a monthly household data quota. In this example, the user of a client device 500 has selected the movie "Casablanca" for streaming or downloading. Within the confirmation screen 700*a* provided in response to the movie selection, region 710*a* is displayed to provide information about the movie and/or an image or short video preview of the selected movie. In region 712*a*, the client device 500 has determined and presented the estimated runtime of the selected movie, and the corresponding estimated data usage, as described in step 602. In region 714*a*, the client device 500 has compared the estimated data usage that will be required to retrieve the movie, to one or more network data quotas, and presented an appropriate warning to the user, as described in steps 603 and 604. As shown in this example, the client device 500 has determined or retrieved both the network data quota, as well as the current network usage status against the quota within the current month, in order to estimate how much of the quota will remain if the user proceeds with retrieval of this movie. The network data quota in this case is indicated as a household quota, and thus may be associated with an individual network provider account, or a particular location 107 or LAN. However, as discussed above, in other examples the network data quota may correspond to an individual/personal data quota that is tied to a particular user, or a device data quota that is tied to a particular client device 500. Additionally, although the communication network to which the quota applies is not identified in this example, confirmation screen 700*a* may be presented in response the client device 500 detecting a data quota warning relating to any of the communication networks discussed herein (e.g., IP-based network usages provided by an Internet provide, satellite network usage provided by a satellite television provider system, cable television network usage provided by a cable television provider system, cellular network usage provided by a cellular/mobile data provider, LAN usage monitored and controlled by a local LAN router or modem with a household or office location 107, etc.). Finally, the confirmation screen 700*a* includes a number of options 716*a*, allowing the user to proceed with streaming the video, download the video for later viewing, or cancel the request in view of the network data quota warning 714*a*.

FIG. 7B shows a retrieval error screen 700*b*, generated in step 605, in which the user is presented with a notification indicating that the requested video resource cannot be downloaded or streamed, because the amount of data required to download or stream the requested video will exceed the user's personal weekly data quota. In this example, the user of a client device 500 has selected the movie "2001: A Space Odyssey" for streaming or downloading. Within the error screen 700*b* provided in response to the movie selection, region 710*b* is displayed to provide information about the movie and/or an image or short video preview of the selected movie. In region 712*b*, the client device 500 has determined and presented the estimated runtime of the selected movie, and the corresponding estimated data usage, as described in step 602. In region 714*b*, the client device 500 has compared the estimated data usage that will be required to retrieve the movie, to one or more network data quotas, including a personal weekly data quota associated with the individual user that requested the movie, as described in steps 603 and 604. Upon determining that the user's personal weekly data quota would be exceeded by the downloading or streaming of the movie, the client device 500 may be configured generate and present an error notification 714*b* indicating that the requested movie cannot be streamed or downloaded. Additionally, the error screen 700*b* provides a number of options 716*b* allowing the user to change the currently logged-in user (e.g., so that the network data usage may be applied to a different user's quota), to change the communication network (e.g., so that the movie may be retrieved via a different network where the same data quotas might not apply), or to cancel the request.

Figure 8:
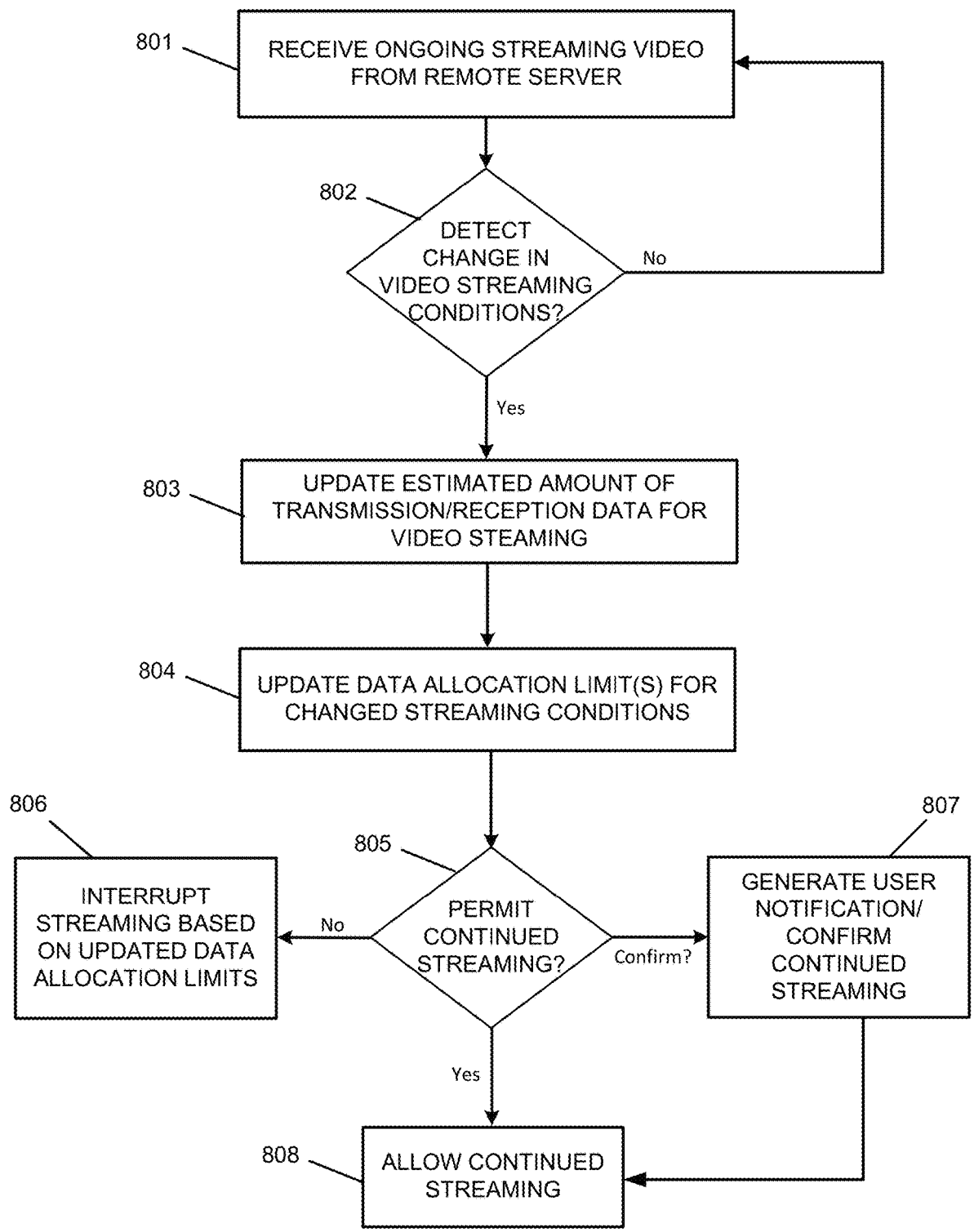
FIG. 8 is a flow diagram illustrating an example process of managing ongoing video streaming on a client device, based on estimated data requirements and data allocation limits, in accordance with certain embodiments of the present disclosure.

Referring now to FIG. 8, another flow diagram is shown illustrating an example process of managing ongoing video streaming by a client device 500, based on ongoing and updated calculations of estimated data requirements and data allocation limits. Certain of the steps 801-808 in this example process may be similar or identical to the steps 601-607 of FIG. 6, discussed above. Additionally, like the steps of FIG. 6, steps 801-808 in FIG. 8 may be performed by a client computing device 500 (e.g., client devices 106, 206, 350/360, etc.). However, while FIG. 6 relates to initial requests to stream or download video resources to a client device 500, FIG. 8 relates to steps performed during a video streaming process which is in progress and ongoing at the client device 500. Thus, as discussed in more detail below, FIG. 8 provides the additional functionality of revising data usage estimates during a video streaming process, and performing corresponding updated calculations to the applicable data quotas over the streaming network(s).

In step 801, the client device 500 is in the process of receiving an ongoing streaming video from a remote server or storage location, over one or more communication networks. As discussed above in FIG. 6, the client device 500 streaming the video in this example may be any of the types of client devices 500 discussed herein, such as personal computing devices, mobile devices, set-top boxes, etc. Additionally, the video may be streaming from any number of remote servers/content libraries, over IP-based networks, television provider networks, cellular network, etc.

In step 802, during the ongoing video streaming process, the client device 500 may detect a change in one or more characteristics of the video streaming process. One example of a change that may be detected by the client device 500 in step 802 is a change in the bit rate and quality of the video being streamed. In adaptive bit rate streaming, for example, upshifts in the bit rate of the transmitted video segments correspond to higher quality video, but may also increase the estimated amount of data that will be required to stream the remaining portion of the video. Similarly, downshifts in bit rate and video quality may decrease the estimated amount of data that will be required to stream the remaining portion of the video. Bit rate upshifts or downshifts may be initiated by the video player application on the client device 500, by the back-end server streaming the video, and/or by the networks or other intermediary devices. Regardless of which component initiates a bit rate shift, or why, the shift may be detectable to the client device 500, and the detection of such a shift in step 802 may trigger the performance of steps 803-808, discussed below.

Another example of a video streaming change that may be detected by the client device 500 in step 802 is the movement of the client device 500 from one streaming network to another. For example, a user streaming a video to their smart phone 500 via a first cellular network may arrive home (or to another location) while the video is streaming, at which point the user's phone 500 may connect to an available WiFi connection to continue the streaming over the local WiFi network rather than the cellular network. Such changes in the communication networks used to stream the video may affect which quotas for network data usage that the subsequent streaming will apply to, and thus a streaming network change detected in step 802 also may trigger the performance of steps 803-808.

Yet another example of a video streaming change that may be detected by the client device 500 in step 802 is the user skipping around during playback of the streaming video. For instance, if a user begins streaming of a 120 minute movie, but then quickly jumps ahead to watch only the final 20 minutes of the movie, then the estimated data usage for streaming the video may be decreased accordingly. Similarly, if the user is nearing the end of a streaming video, and then jumps back to begin streaming from the beginning, then the estimated data usage for streaming the video may be increased accordingly.

Additionally, although these examples relate to updating the data usage estimates and network data quota calculations based on the detection of a change in the video streaming process, in other examples the client device 500 may be configured to updating its data usage and network data quota calculations in steps 803-808 even if no video streaming change is detected. For instance, in some embodiments, updating of data usage estimates (step 803), network data quotas and remaining data amounts (step 804), and evaluating the updated data to perform the corresponding action (steps 805-808) may be performed on a periodic basis during an ongoing video streaming process (e.g., every 5 minutes, every 10 minutes, every 30 minutes, every 60 minutes, . . . , etc.), even if there is no change detected in the streaming conditions in step 802.

In step 803, the client device 500 may determine an updated estimate of the amount of data required to be transmitted over the network to complete to streaming of the current video. Thus, the process of performing step 803 may be similar or identical to that of step 602, discussed above. However, within step 803, the client device 500 may take into account additional factors, for example, reducing the updated data estimate based on the portion of the video that has already been streamed, as well as taking into account any changes in the streaming process or conditions detected in step 802 (e.g., increased or decreased streaming bit rate, additional security/network overhead, etc.), and/or transmission performance data based on the portion of the video already streamed (e.g., adjusting the estimated transmission efficiency based on Internet traffic levels, weather interference with satellite transmissions, etc.).

In step 804, the client device 500 may determine updated data allocation limits/data quotas associated with the combination of the streaming network(s) and the entities (e.g., individual users, devices, locations, etc.) associated with the video streaming process. Thus, the process of performing step 804 may be similar or identical to that of step 603, discussed above. In some cases, the updated data quotas determined in step 804 may correspond to entirely different data quotas then those determined in step 603, for example, if the communication network used to streaming the video changes during the streaming process, as discussed above. Additionally, in some examples the entities associated with the streaming process (e.g., switching the streaming to a different user account, a different client device, etc.) may change during the streaming process, and thus different network data quotas may apply. In other cases, even if the network data quotas determined in step 804 are the same quotas as those determined in step 603 (e.g., indicating that the same combination of entities and networks), the current data usage status of those quotas still may be different in step 804, based on the amount of data transmitted so far during the video streaming and/or any other data usage applicable to the same quota during that time.

In step 805, the client device 500 may determine whether or not to permit the continued streaming of the video, or to interrupt and/or stop the streaming process, based on the updated estimates of the amount of data required to stream the remaining portions of the video (step 803) and the updated network data quota/usage determinations (step 804). Thus, the process of performing step 805 may be similar or identical to that of step 604, discussed above. Specifically, in this example, based on the comparison of the updated streaming data estimates to the data still available within the applicable data quotas, the client device 500 may interrupt the video streaming process in step 806, may generate and present a warning notification that allows the user to either stop or continue streaming the video in step 807, or may continue the streaming process without any interruption or notification to the user in step 808.

Although the above examples relate to managing video streaming and downloading based on evaluations of network data usage quotas, it should be understood that similar techniques may be implemented based on evaluations of any other limitations of computing resources that may be effected by video streaming, downloading, and playback. For example, FIGS. 9 and 10A-10B, discussed below, illustrate similar techniques for managing video streaming and playback based on evaluations of the current battery life of the client device 500. In still other examples, a particular user and/or a particular client device 500 may be allocations limits on other types of computing resources, such as memory usage, processing capacity, overall screen time usage, etc., and similar techniques to those described herein may be performed based on usage estimates for each of these different types of computing resources.

Figure 9:
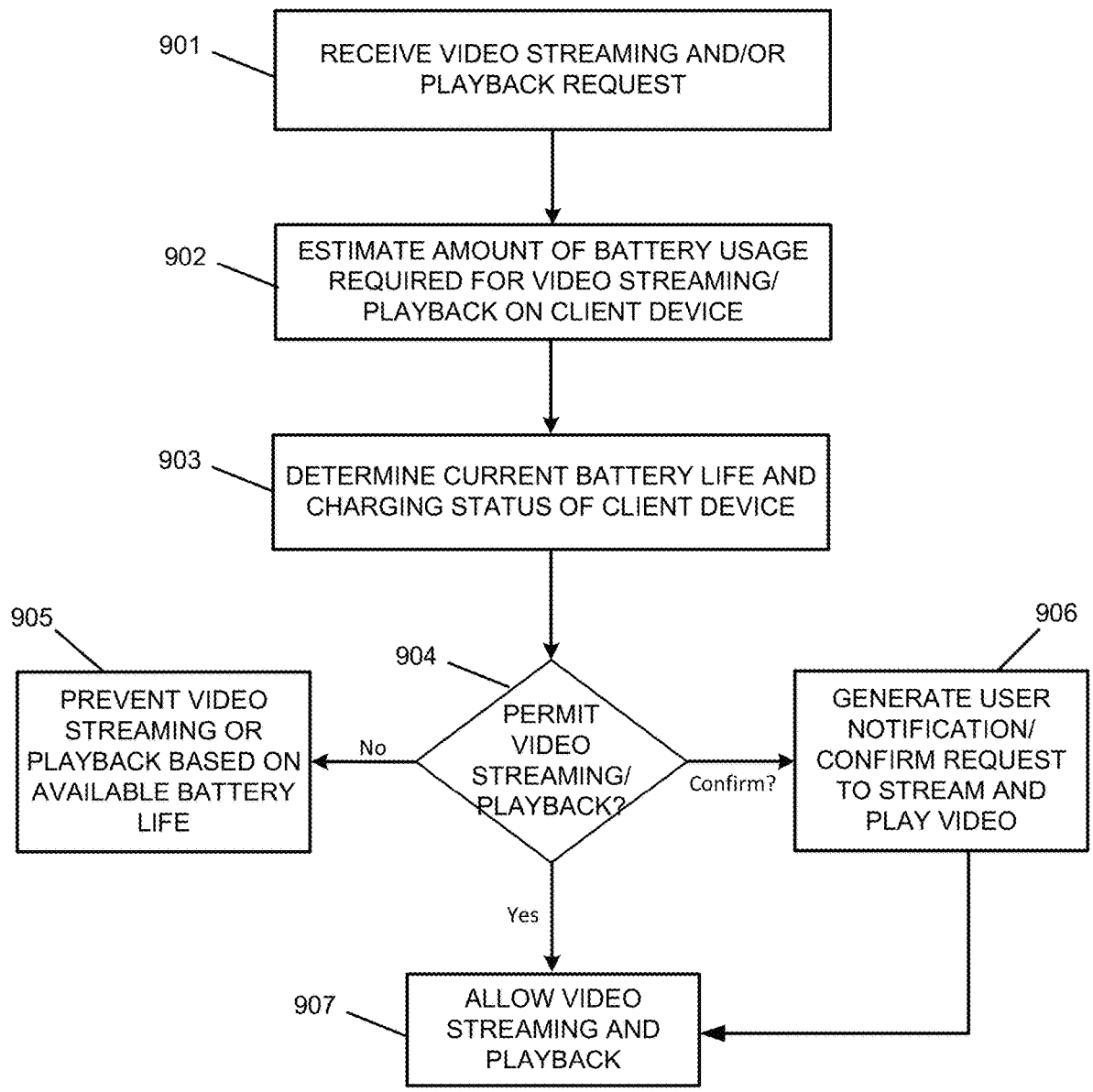
FIG. 9 is a flow diagram illustrating an example process of handling requests for video streaming and/or playback on a client device, based on estimated battery usage data and battery status data, in accordance with certain embodiments of the present disclosure.

Referring now to FIG. 9, another flow diagram is shown illustrating an example process of handling requests at client devices (and in particular for mobile battery-powered devices) for video streaming and downloading, based on estimates battery usage requirements and battery life availability. Certain of the steps 901-907 in this example process may be similar or identical to the steps 601-607 of FIG. 6, discussed above. Additionally, like the steps of FIG. 6, steps 901-907 in FIG. 9 may be performed by a client computing device 500 (e.g., mobile client device 106 or 206).

In step 901, a request is initiated at a mobile device 500 to stream and/or play a video resource. In some cases, the request in step 901 may be similar or identical to that of step 601, discussed above. As discussed above in FIG. 6, the mobile device 500 receiving and handling the request in this example may be any of the types of mobile devices 500 discussed herein, such as laptop or tablet computers, smart phones, portable gaming systems, human-wearable devices, etc. Additionally, the video may be requested from any number of remote servers/content libraries, over IP-based networks, television provider networks, cellular network, etc. However, while the video request discussed above in FIG. 6 relates to transmission of the video resource (e.g., streaming or downloading from a remote server), the video request in step 901 relates to execution/playback of the video resource (e.g., either streaming/playing a video from a remote server, or playing a locally stored video resource on the mobile device 500) on a mobile device 500 that is currently not charging and operating on battery power.

In step 902, the mobile device 500 may determine an estimate for the amount of usage/output for the battery 560 of the mobile device 500, that will be required to stream and/or playback the video resource requested in step 901. In some examples, the estimated amount of battery usage may be calculated based on the length of the requested video times the battery discharge rate associated with video playback on the mobile device 500. In some cases, the mobile device 500 may assume a predetermined battery discharge rate for the calculation in step 902, based on the device type, video player application, screen size, graphics processors, and other hardware-specific characteristics of the mobile device 500. In other cases, the mobile device 500 may determine a discharge rate of the battery 560 associated with video playback empirically based on battery data collected during previous video playback processes, and/or based on additional factors such as environmental conditions and current device settings.

For example, in various embodiments, the mobile device 500 may calculate an estimated battery discharge rate in step 902 to stream and/or play the requested video resource, based in part on device settings such as the current screen brightness, video window size and/or video presentation quality, sound output volume and quality, and the like. In some cases, the mobile device 500 may use sensors 516 measure one or more environmental conditions (e.g., current ambient temperature, battery temperature, ambient light, etc.) which may affect the battery discharge rate. Additionally or alternatively, sensors 516 can detect the status of the battery 560 (e.g., current discharge rate). Over time, the mobile device 500 may detect that its battery 560 has degraded, reducing the battery discharge efficiency and battery life. Additionally, the mobile device 500 may determine different battery discharge rates for video streaming from a remote location, versus video playback of local video content.

Further, the battery discharge rate determined in step 902 may be based not only on the discharge rate associated with video streaming/playback, but also based on any other processes currently executing or scheduled on the mobile device 500 which be identified as battery-intensive or that may otherwise affect the battery discharge rate during streaming and/or playback of the requested video. For instance, if mobile device 500 has several other applications currently open and/or is performing additional resource-intensive tasks at the time the video request is received, then a higher battery discharge rate may be determined in step 902, in order to account for the additional applications/processes that the mobile device is performing concurrently with the video streaming and/or playback tasks.

In step 903, the mobile device 500 may determine the current status of its battery 560 (e.g., current percentage capacity and/or estimated battery life remaining, etc.), along with an anticipated charging status for the mobile device 500. The determination of the current battery status of the mobile device 500 may be correspond to a straightforward operating request to a battery monitor feature of the mobile operating system, and the output of which may be expressed in percentage, time, and/or power capacity.

Additionally, in step 903, the mobile device 500 also may estimate the upcoming battery charging opportunities for the mobile device 500, in order to determine how long until the mobile device 500 is likely to be charged. In some embodiments, the mobile device 500 may access device charging log data and identify patterns in device charging to determine the next time that the device 500 is likely to be charged. For example, if the device charging data stored by the mobile device 500 indicates that the user charges the device 500 every night between 9 pm and 10 pm, the mobile device 500 may determine a next charging time estimate based on this data. Additionally or alternatively, the mobile device 500 may access one or more additional data source to aid in the prediction of the next estimated charging time for the device. For instance, the mobile device 500 may access the user's current calendar data and analyze the upcoming scheduled appointments, times, and locations in order to predict when the device might next be charged. In other examples, the mobile device 500 may use location data (e.g., via GPS receiver 570, or by detecting the availability of particular wireless networks, etc.), travel/motion data, and the like, to predict the user's current location and their destination (e.g., driving home or to the office, traveling by air or train to a different city, etc.) and to make a corresponding time prediction regarding when the user will arrive at the destination. For instance, if the mobile device 500 determines based on calendar data, network data, location/movement data, or the like, that the user is just taking off on a 3-hour flight to the user's home city, then the mobile device 500 may estimate a next charging opportunity in 4 hours and 30 minutes (based on the flight time, transition time, and driving distance/time to the user's home, etc.).

In step 904, the mobile device 500 may determine whether or not to permit the streaming and/or playback of the video requested in step 901, based on the estimation of battery usage required to stream/play the requested video determined in step 902, and based on the current battery status and/or anticipated charging opportunity data determined in step 903. Thus, the process of performing step 904 may be similar to that of step 604, discussed above. For example, in some embodiments, the mobile device 500 may simply compare the estimated amount of battery life needed to stream/play the requested video to the current battery life of the mobile device 500. If the required battery life exceeds the available battery life, then the mobile device 500 might prevent the retrieval of the requested video resource, as shown in step 905. Alternatively, the mobile device 500 may present a warning notification via a user interface on the mobile device 500, and may require user confirmation via the user interface before proceeding with the video streaming/playback of the requested video resource, as shown in step 906.

In other embodiments, the mobile device 500 may compare the estimation of battery usage required to stream/play the requested video to multiple different thresholds. For instance, if the required amount of battery capacity would exceed the available battery life, then the mobile device 500 may prevent the video streaming/playback in step 905. However, if the required amount of battery capacity would not exceed the current battery life of the device, but would approach it within a predetermine threshold, then the mobile device 500 may present a warning notification in step 906. Alternatively, if the available battery life far exceeds the required amount of battery capacity to stream/play the requested video, or if the mobile device 500 determines that the device is likely to be charged before running out of battery life, then the mobile device 500 may be permitted to continue with the streaming and/or playback of the requested video resource in step 907, without any additional confirmation or input from the user. Although this example illustrates three possible processing paths following the evaluation in step 904, it should be understood more or less determinations/processing paths may be used in other examples, corresponding to different levels/types of warnings, different user options for the video streaming/playback, different required authorizations, and the like.

Figure 10A:
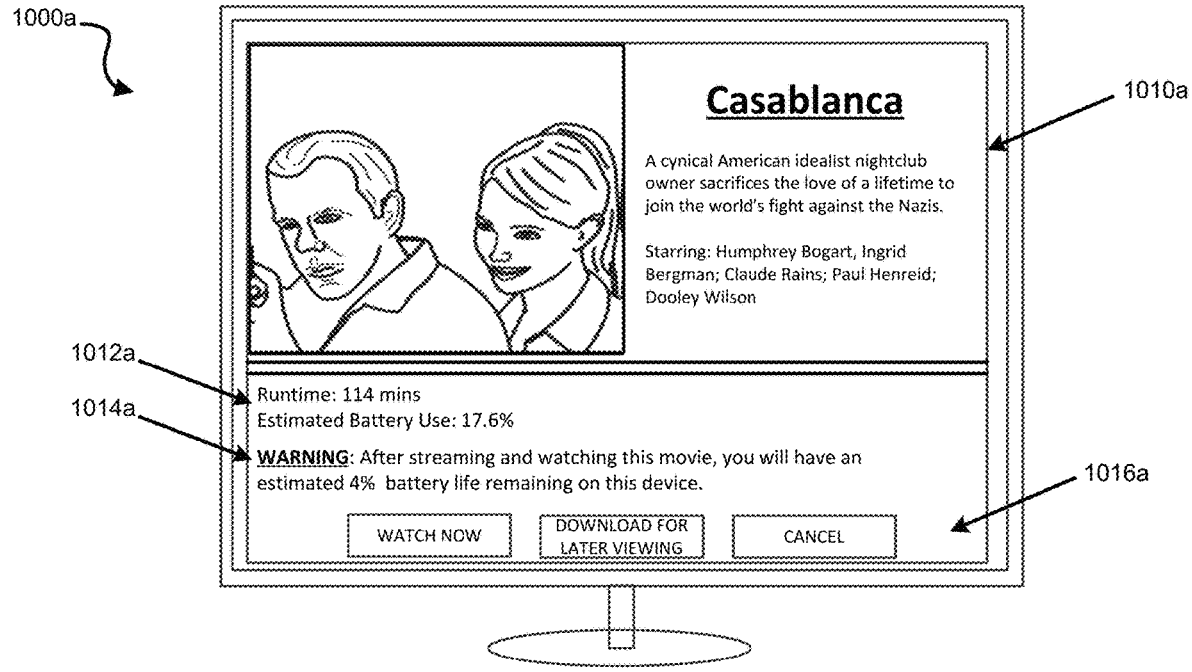
FIGS. 10A and 10B are two example user interface displays generated in response to video streaming and/or playback requests, in accordance with certain embodiments of the present disclosure.
Figure 10B:
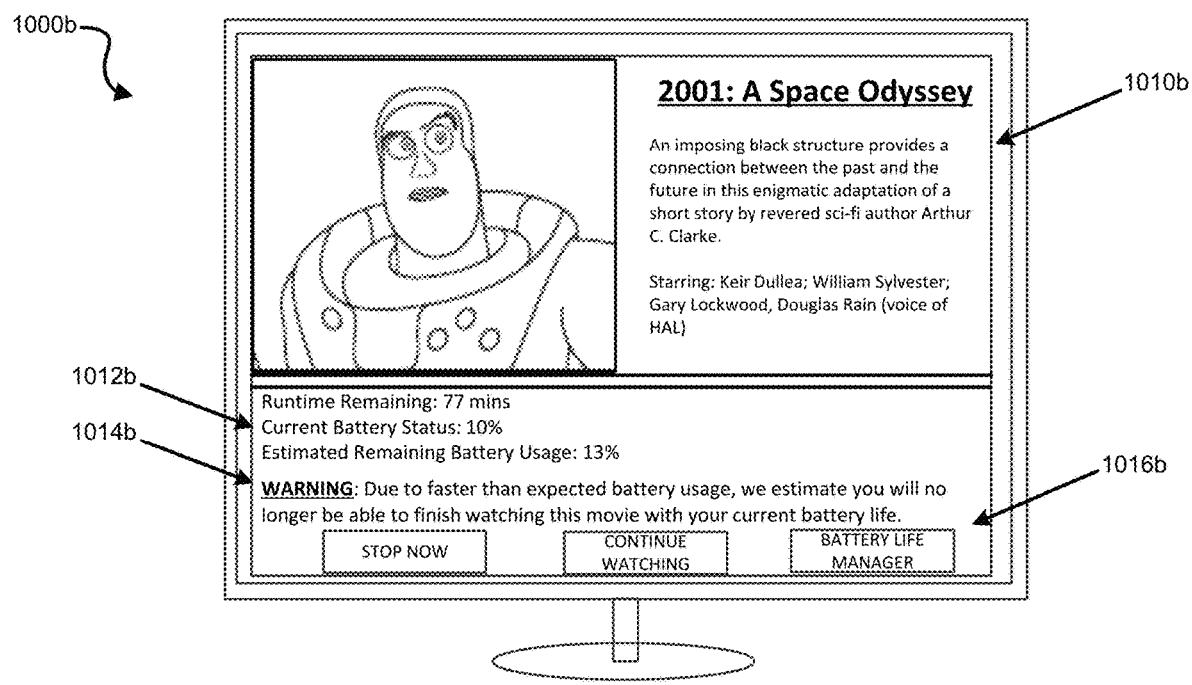

Referring now to FIGS. 10A and 10B, two additional user interface screens are shown illustrative of the possible processing paths that a mobile device 500 may perform in response to a comparison in step 904 between a required amount of battery capacity to stream or play a requested video, and the current battery life of the mobile device 500. FIG. 10A, for example, shows a first confirmation screen 1000a, generated in step 906, in response to a user's initial request to begin streaming and/or playing a movie on the mobile device 500. In this example, the user is presented with a warning notification indicating that the amount of battery data required to stream/play the requested video will approach (but not exceed) the estimated battery life of the mobile device 500. In this example, the user of a mobile device 500 has selected the movie "Casablanca" for streaming or downloading. Within the confirmation screen 1000a provided in response to the movie selection, region 1010a is displayed to provide information about the movie and/or an image or short video preview of the selected movie. In region 1012a, the mobile device 500 has determined and presented the estimated runtime of the selected movie, and the corresponding estimated battery usage, as described in step 902. In region 1014a, the mobile device 500 has compared the estimated battery usage that will be required to stream or play the movie, to the current battery life/status of the mobile device 500, and presented an appropriate warning to the user, as described in steps 903 and 904. As shown in this example, the mobile device 500 has determined how much of the mobile device's battery life is likely to remain if the user continues with streaming/playing this movie. Finally, the confirmation screen 1000a includes a number of options 1016a, allowing the user to proceed with streaming/playback of the video, to download the video for later viewing, or cancel the request in view of the battery warning 1014a.

FIG. 10B shows a shows a second confirmation screen 1000b, that may be generated in a subsequent execution of step 906 performed during an ongoing video streaming/playback process. Using similar techniques to those discussed above in FIG. 8, the estimations of the battery usage required to stream/play a requested video, as well as the determinations of the current battery life of the mobile device and anticipated charging status may be performed multiple times before and/or during the video streaming/playback processes. Similar to the discussion above in step 802, some or all of the steps 902-907 may be executed multiple times, either periodically or in response to the detection of particular changes (e.g., changes to estimated video playback time, changes to battery discharge rate, etc.) during the video streaming/playback process. Thus, the second confirmation screen 1000b shown in FIG. 10B may correspond to a warning notification generated by step 906 during an ongoing video streaming/playback process. In this example, the user of the mobile device 500 has selected the movie "2001: A Space Odyssey" for remote streaming or playback from local storage. Within the confirmation screen 1000b, region 1010b is displayed to provide information about the movie and/or an image or short video preview of the movie being watched. In region 1012b, the mobile device 500 has determined and presented an updated estimate of the remaining runtime of the movie, the current battery status of the mobile device, and the corresponding estimated battery usage, as described in step 902. In region 1014b, the mobile device 500 has compared the updated estimate of the battery usage that will be required to stream or play the remaining portion of the movie, to the current updated battery life/status of the mobile device 500, and presented an appropriate warning to the user, as described in steps 903 and 904. As shown in this example, the mobile device 500 has generated an updated estimate indicated that the current battery life of the mobile device 500 is likely to be sufficient to complete the streaming/playback of the current movie. Finally, the confirmation screen 1000b includes a number of options 1016b, allowing the user to stop the current playback of the movie, continue watching the movie, or access a battery/power manager application on the mobile device 500, through which the user may potentially configure the device settings and/or close currently executing processes in order to increase the battery life estimate.

Additionally, although the examples described herein relating to managing video downloading and streaming based on data allocation limits, and managing video streaming and playback based on battery usage estimates have been described separately, it should be understood that this techniques and embodiments may be combined. For example, a video streaming request from a mobile device 500 may initiate both the processes illustrated in FIG. 6 and in FIG. 9, and the subsequent actions taken or notifications presented by the mobile device 500 may be based on the analyses of both data usage and battery usage, along with any other device resource management functionality performed in connection with the same video downloading, streaming, and playback processes.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. In some embodiments, the entirety of one or more programs of interest may be recorded, and highlights within each program may be marked so that the user may directly skip to one highlight at a time.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A computing system, comprising:
   one or more network interfaces to communicatively couple with one or more remote servers via one or more remote communication networks, and to communicatively couple with one or more video playback client devices via one or more local communication networks;
   one or more processors; and
   one or more computer-readable storage media having computer executable instructions stored thereon, which, when executed by the one or more processors, causes the computing system to:
   receive a request from a requesting device of the video playback client devices via the one or more local communication networks to retrieve a particular video resource from a plurality of video resources that are available from the one or more remote servers via the one or more remote communication networks;
   determine, responsive to the request, a plurality of network path options by which to deliver the particular video resource from the one or more remote servers to the requesting device via the one or more remote communication networks, the computing system, and the one or more local communication networks;
   determine, for each of the plurality of network path options, a respective predicted impact to one or more hardware resources of the requesting device that is predicted to result from retrieval and/or playback of the particular video resource by the requesting device via the network path option; and
   control the retrieval and/or playback of the particular video resource by the requesting device based on the respective predicted impact determined for each network path option.

2. The computing system of claim 1, wherein the instructions, when executed by the one or more processors, cause the computing system to determine, for each network path option, the respective predicted impact to the one or more hardware resources by:
   determining a first respective predicted impact predicted to result from streaming retrieval and/or playback of the particular video resource by the requesting device via the network path option; and
   determining a second respective predicted impact predicted to result from downloading the particular video resource to local storage via the network path option and subsequent playback of the particular video resource from the local storage.

3. The computing system of claim 1, wherein the instructions, when executed by the one or more processors, cause the computing system further to:
   determine, for each network path option of the plurality of network path options, a respective data reception characteristic for the requesting device to retrieve the particular video resource via the network path option,
   wherein the instructions, when executed by the one or more processors, cause the computing system to determine the respective predicted impact for each network path option based at least on the respective data reception characteristic determined for the network path option.

4. The computing system of claim 1, wherein the instructions, when executed by the one or more processors, cause the computing system further to:
   determine, for each network path option of the plurality of network path options, a respective data reception characteristic for the requesting device to retrieve the particular video resource via the network path option,
   wherein the instructions, when executed by the one or more processors, cause the computing system to determine the respective predicted impact for each network path option based at least on aggregating the respective data reception characteristics determined for a combination of multiple of the network path options.

5. The computing system of claim 1, wherein the instructions, when executed by the one or more processors, cause the computing system further to:
   determine, responsive to the request, a current hardware resource status of the one or more hardware resources of the requesting device,
   wherein the instructions, when executed by the one or more processors, cause the computing system to control the retrieval and/or playback of the particular video resource by the requesting device based on comparing each respective predicted impact determined for each network path option with the current hardware resource status of the one or more hardware resources of the requesting device.

6. The computing system of claim 5, wherein the instructions, when executed by the one or more processors, cause the computing system further to:
   control the retrieval and/or playback of the particular video resource by directing the retrieval and/or playback of the particular video resource by the requesting device via one or more of the plurality of network path options based on the comparing indicating that the respective predicted impact determined for the one or more of the plurality of network path options is compatible with the current hardware resource status of the one or more hardware resources of the requesting device.

7. The computing system of claim 5, wherein the instructions, when executed by the one or more processors, cause the computing system further to:
   control the retrieval and/or playback of the particular video resource by preventing the retrieval and/or playback of the particular video resource by the requesting device via one or more of the plurality of network path options based on the comparing indicating that the respective predicted impact determined for the one or more of the plurality of network path options is incompatible with the current hardware resource status of the one or more hardware resources of the requesting device.

8. The computing system of claim 2, further comprising the local storage.

9. A method comprising:
receiving, by a computing system in communication with one or more remote servers via one or more remote communication networks and with one or more video playback client devices via one or more local communication networks, a request from a requesting device of the video playback client devices via the one or more local communication networks to retrieve a particular video resource from a plurality of video resources that are available from the one or more remote servers via the one or more remote communication networks;
determining, by the computing system responsive to the request, a plurality of network path options by which to deliver the particular video resource from the one or more remote servers to the requesting device via the one or more remote communication networks, the computing system, and the one or more local communication networks;
determining, by the computing system responsive to the request for each of the plurality of network path options, a respective predicted impact to one or more hardware resources of the requesting device that is predicted to result from retrieval and/or playback of the particular video resource by the requesting device via the network path option; and
controlling the retrieval and/or playback of the particular video resource by the requesting device based the respective predicted impact determined for each network path option.

10. The method of claim 9, wherein the controlling the retrieval and/or playback of the particular video resource comprises initiating the retrieval and/or playback of the particular video resource by the requesting device via one of the network path options responsive to determining that the respective predicted impact determined for the one of the network path options is compatible with a current hardware resource status of the one or more hardware resources of the requesting device.

11. The method of claim 9, wherein the controlling the retrieval and/or playback of the particular video resource comprises preventing the retrieval and/or playback of the particular video resource by the requesting device via at least one of the network path options responsive to determining that the respective predicted impact determined for the at least one of the network path options is incompatible with a current hardware resource status of the one or more hardware resources of the requesting device.

12. The method of claim 9, further comprising:
determining, for each network path option of the plurality of network path options, a respective data reception characteristic for the requesting device to retrieve the particular video resource via the network path option,
wherein the determining the respective predicted impact for each network path option is based at least on the respective data reception characteristic determined for the network path option.

13. The method of claim 12, wherein the determining the respective predicted impact for each network path option is based at least on aggregating the respective data reception characteristics determined for a combination of multiple of the network path options.

14. The method of claim 9, further comprising:
determining, responsive to the request, a current hardware resource status of the one or more hardware resources of the requesting device,
wherein the controlling the retrieval and/or playback of the particular video resource by the requesting device is based on comparing each respective predicted impact determined for each network path option with the current hardware resource status of the one or more hardware resources of the requesting device.

15. The method of claim 9, wherein the determining, for each network path option, the respective predicted impact to the one or more hardware resources comprises:
determining a first respective predicted impact predicted to result from streaming retrieval and/or playback of the particular video resource by the requesting device via the network path option; and
determining a second respective predicted impact predicted to result from downloading the particular video resource to local storage via the network path option and subsequent playback of the particular video resource from the local storage.

* * * * *